US011781349B2

(12) United States Patent
Klein et al.

(10) Patent No.: US 11,781,349 B2
(45) Date of Patent: Oct. 10, 2023

(54) CLOSURE LATCH ASSEMBLY FOR FRONT TRUNK WITH PEDESTRIAN PROTECTION FEATURES

(71) Applicant: MAGNA BOCO GMBH, Wuppertal (DE)

(72) Inventors: Jörg Thomas Klein, Leverkusen (DE); Francesco Cumbo, Pisa (IT)

(73) Assignee: MAGNA CLOSURES INC., Newmarket (CA)

(*) Notice: Subject to any disclaimer, the term of this patent is extended or adjusted under 35 U.S.C. 154(b) by 0 days.

(21) Appl. No.: 17/576,811

(22) Filed: Jan. 14, 2022

(65) Prior Publication Data

US 2022/0228404 A1 Jul. 21, 2022

Related U.S. Application Data

(60) Provisional application No. 63/241,422, filed on Sep. 7, 2021, provisional application No. 63/168,743, filed on Mar. 31, 2021, provisional application No. 63/150,071, filed on Feb. 16, 2021, provisional application No. 63/139,636, filed on Jan. 20, 2021.

(51) Int. Cl.

| | |
|---|---|
| ***B60R 21/38*** | (2011.01) |
| ***E05B 77/08*** | (2014.01) |
| ***E05B 83/16*** | (2014.01) |
| ***E05B 83/24*** | (2014.01) |
| ***E05B 85/00*** | (2014.01) |

(52) U.S. Cl.

CPC .............. *E05B 77/08* (2013.01); *E05B 83/24* (2013.01)

(58) Field of Classification Search

CPC ........ E05B 77/08; E05B 83/24; E05B 83/243; E05B 83/16; E05B 85/00; B60R 21/38

See application file for complete search history.

(56) References Cited

U.S. PATENT DOCUMENTS 8,573,658 B2 11/2013 Kim
9,145,716 B2 9/2015 Jayasuriya et al.
(Continued)

FOREIGN PATENT DOCUMENTS

CN 110439393 A * 11/2019 ............. B60R 21/38
DE 10354163 B4 6/2005
(Continued)

OTHER PUBLICATIONS

Description Translation for KR 101542692 from Espacenet (Year: 2015).*

*Primary Examiner* — Jason D Shanske
*Assistant Examiner* — Daniel M. Keck
(74) *Attorney, Agent, or Firm* — Dickinson Wright PLLC

(57) ABSTRACT

A pedestrian protection feature for a closure latch assembly and method for moving a hood of a motor vehicle to a pop-up position and an open position are provided. The pedestrian protection feature includes an actuator configured to translate a slide cam member to cause a hook to pivot into a striker retaining position to prevent removal of a striker from the closure latch assembly and to pivot a lift lever into engagement with the striker to move the striker toward the hook, whereat the hood is moved to the pop-up position, and optionally a release feature to move the hook from the striker retaining position to a striker releasing position to allow the hood to be moved from the pop-up position to an open position.

20 Claims, 24 Drawing Sheets

(56) References Cited

U.S. PATENT DOCUMENTS

| | | | |
|---|---|---|---|
| 9,382,731 B2 | 7/2016 | Kim et al. | |
| 9,637,083 B2 | 5/2017 | Schlittenbauer et al. | |
| 9,863,170 B2 | 1/2018 | Park et al. | |
| 2013/0033069 A1 | 2/2013 | Hwang | |
| 2015/0054293 A1 | 2/2015 | Kim et al. | |
| 2016/0340941 A1* | 11/2016 | Taurasi | E05B 83/24 |
| 2019/0128028 A1 | 5/2019 | Herline et al. | |
| 2021/0301565 A1* | 9/2021 | Sasaki | E05B 85/245 |
| 2022/0162887 A1* | 5/2022 | Page | E05B 83/24 |
| 2022/0316244 A1* | 10/2022 | Gumbo | E05B 85/26 |

FOREIGN PATENT DOCUMENTS

| | | | |
|---|---|---|---|
| DE | 102005060750 A1 | | 6/2007 |
| DE | 102007021840 B4 | | 11/2008 |
| DE | 102013202207 A1 | | 8/2014 |
| DE | 102013114414 A1 | | 2/2015 |
| DE | 102013114106 A1 | | 4/2015 |
| DE | 102006012090 B3 | | 10/2017 |
| DE | 102017122573 A1 | | 3/2019 |
| JP | 2016064778 A | * | 4/2016 |
| KR | 101542692 B1 | * | 8/2015 |
| WO | WO-2022040408 A1 | * | 2/2022 |

* cited by examiner

CLOSURE LATCH ASSEMBLY FOR FRONT TRUNK WITH PEDESTRIAN PROTECTION FEATURES

CROSS-REFERENCE TO RELATED APPLICATIONS

This application claims the benefit of U.S. Provisional Application Ser. No. 63/241,422, filed Sep. 7, 2021, of U.S. Provisional Application Ser. No. 63/168,743, filed Mar. 31, 2021, of U.S. Provisional Application Ser. No. 63/150,071, filed Feb. 16, 2021, and of U.S. Provisional Application Ser. No. 63/139,636, filed Jan. 20, 2021, all of which are incorporated herein by reference in their entirety.

FIELD

The present disclosure related generally to a power-operated closure latch assembly for a motor vehicle closure system. More specifically, the present disclosure is directed to a closure latch assembly providing power release pedestrian protection functionality and which is well-suited for use with a front hood latching system in a motor vehicle.

BACKGROUND

It is desired to best protect pedestrians against injury resulting from head on collisions with vehicles. When a car hits a pedestrian in a front end collision, the pedestrian can be thrown up and land on the front hood of the vehicle. In an effort to lessen the harshness of the impact of the pedestrian against the vehicle, and in particular to prevent the person's head from impacting the engine block or other hard object located directly beneath the front hood, it would be desirable to actively space the front hood from the engine block prior to the pedestrian impacting the front hood. In particular, when a front end collision is imminent, it would be desirable to move the front hood in a very short period of time (e.g., in milliseconds) from a fully closed first position, where the front hood is normally located immediately adjacent the engine block, to a second position where the front hood is actively and controllably moved further away from the engine block. The movement of the hood to the second position could provide the pedestrian's head and/or body with sufficient time and/or cushion space to more gradually decelerate as the pedestrian impacts the front hood, thereby potentially lessening the risk of severe injury to the pedestrian.

It is further desired to minimize the cost and complexity of motor vehicle safety systems and components thereof. Further yet, it is desired to be able to provide an ability to drive a vehicle away from an accident site without reasonable concern of the damaged hood opening while driving or otherwise transporting the vehicle. Additionally, it is desired to be able to minimize the number of components needed to be replaced upon actuation of the vehicle safety system. It is further desired to ensure sufficient and ample time exists to fully deploy the motor vehicle safety system prior to a person impacting the front hood of the vehicle, thereby minimizing the potential seriousness of injury the person. These desires, problems and others associated with accidents causing damage to a hood are recognized, as would be readily understood by those skilled in the art of vehicle closure panels.

Desired is a hood latch and system therewith which provides solutions to these issues, as well as other issues understood by a person skilled in the art of vehicle hood panels.

SUMMARY

This section provides a general summary of the inventive solutions associated with the present disclosure. Accordingly, this section is not intended to be interpreted as a comprehensive and exhaustive listing of all features, aspects, objectives and/or advantages associated with the inventive solutions which are further described and illustrated in the following detailed description and the appended drawings.

It is an objective of the present disclosure to provide a pedestrian protection feature for use with a front hood latching system of a motor vehicle which addresses at least those issues discussed above.

It is a related objective of the present disclosure to further provide a motor vehicle hood latch system for use with any model of motor vehicle.

It is a related objective of the present disclosure to further provide a motor vehicle hood latch and closure system therewith for use with front trunk (frunk) hood.

It is a further objective of the present disclosure to provide a motor vehicle hood latch with pedestrian protection feature having an ability to automatically sense an imminent front end impact and release a vehicle hood from a fully closed position to a partially open position without need of action from a driver of the vehicle and prior to a pedestrian impacting the vehicle hood.

It is a further objective of the present disclosure to provide a motor vehicle hood latch and pedestrian protection feature therefor with an ability to prevent the vehicle hood from inadvertently moving to a fully open position while transporting the vehicle after an accident.

In accordance with these and other objectives, it is an aspect of the present disclosure to provide a hood latch system with a pedestrian protection feature that embodies the inventive concepts set forth in the following detailed description and illustrations.

It is a further aspect of the present disclosure to provide a method of configuring a hood latch system with a pedestrian protection feature that embodies the inventive concepts set forth in the following detailed description and illustrations.

In accordance with another aspect of the disclosure, a closure latch system for a hood of a motor vehicle for moving a hood fixed to a striker to a pop-up position in response to an immanent impact is provided. The closure latch system includes a closure latch assembly including a ratchet and at least one pawl. The ratchet is moveable between a striker capture position, whereat the ratchet retains the striker in a fully captured position and whereat the hood is in a fully closed position, a striker partial release position, whereat the ratchet retains the striker in a partially released position and whereat the hood is in a partially open position, and a striker release position, whereat the ratchet releases the striker and whereat the hood can be moved to a fully open position. The at least one pawl is moveable between a primary lock position, whereat the at least one pawl holds the ratchet in the striker capture position and a ratchet releasing position whereat the at least one pawl releases the ratchet to the striker partial release position. The closure latch system further includes a pedestrian protection system. The pedestrian closure system includes an actuator configured to translate a slider to cause a hook to move into a striker retaining position to prevent removal of the striker from the closure latch assembly and to move the lift lever into engagement with the striker to move the striker into engagement with the hook, whereat the hood is moved to the pop-up position.

In accordance with another aspect of the disclosure, the actuator is configured to translate the slider along a straight path to cause the hook to pivot about a hook axis into a striker retaining position.

In accordance with another aspect of the disclosure, the pedestrian protection system further includes a pawl lever, wherein the slider is configured to move the pawl lever to operably move the at least one pawl from the primary lock position to the ratchet releasing position.

In accordance with another aspect of the disclosure, the slider can be provided having a first cam surface configured to move the hook into the striker retaining position, a second cam surface configured to move the pawl lever to operably move the at least one pawl from the primary lock position to the ratchet releasing position, and a third cam surface configure to move the lift lever into engagement with the striker to move the striker into engagement with the hook.

In accordance with another aspect of the disclosure, the first cam surface can be configured to move the hook into the striker retaining position prior to causing the at least one pawl to move from the primary lock position to the ratchet releasing position.

In accordance with another aspect of the disclosure, the first cam surface moves the hook into the striker retaining position prior to the second cam surface causing the pawl lever to allow the at least one pawl to move from the primary lock position to the ratchet releasing position, thereby protecting against an inadvertent release of the striker from the ratchet.

In accordance with another aspect of the disclosure, the second cam surface can be configured to move the pawl lever to the ratchet releasing position prior to the third cam surface moving the lift lever into engagement with the striker.

In accordance with another aspect of the disclosure, the lift lever and the pawl lever can be configured to pivot about a common axis.

In accordance with another aspect of the disclosure, the slider, the hook and the lift lever can be configured in coplanar relation with one another to pivot within a common plane.

In accordance with another aspect of the disclosure, a release lever can be operably coupled to the hook, the release lever having a rest position, whereat the hook remains in the striker retaining position while the actuator is in the actuated position, and an actuated position, whereat the hook is moved from the striker retaining position to a striker releasing position while the actuator is in the actuated position, whereat the striker can be removed from the ratchet and the hood can be moved to the fully open position.

In accordance with another aspect of the disclosure, a release member can be fixed to the release lever, wherein the release member is configured for manual actuation to move the release lever from the rest position to the actuated position.

In accordance with another aspect of the disclosure, the release member can be provided as one of a rod or cable.

In accordance with another aspect of the disclosure, the release lever is supported for pivotal movement by a pin and the slider is provided having a slot configured for receipt of the pin therein, wherein the pin slides through the slot as the slider moves from the non-deployed position to the deployed position.

In accordance with another aspect of the disclosure, the release lever has a drive feature and the hook has a driven feature, the drive feature being configured for engagement with the driven feature when the release lever moves from the rest position to the actuated position to move the hook from the striker retaining position to a striker releasing position while the actuator is in the actuated position.

In accordance with another aspect of the disclosure, the drive feature includes a finger extending from an end of the release lever and the driven feature includes a protrusion extending outwardly from the hook.

In accordance with another aspect of the disclosure, the slider has a rest surface arranged for receipt of the driven feature while the actuator is in the non-actuated position, whereat the hook is in the striker releasing position, a first cam surface arranged for engagement with the driven feature while the actuator is in the actuated position, whereat the hook is in striker retaining position, and an over-travel surface arranged for receipt of the driven feature while the actuator is in the actuated position, whereat the hook is in the striker releasing position.

In accordance with another aspect of the disclosure, the rest surface extends from a first end of the cam surface and the over-travel surface extends from a second end of the cam surface opposite the first end.

In accordance with another aspect of the disclosure, the lift lever has a lift lever driven surface and the slider has a lift lever drive surface, wherein the lift lever drive surface engages the lift lever driven surface to move the lift lever into engagement with the striker to move the striker into engagement with the hook.

In accordance with another aspect of the disclosure, the lift lever driven surface is formed in a recess of the lift lever and the lift lever drive surface is formed by a protrusion extending outwardly from the lift lever.

In accordance with another aspect of the disclosure, a blocking feature can be configured for movement between a non-blocking position, whereat the lift lever is in the lift lever rest position, and a blocking position, whereat the lift lever is releasably maintained in the lift lever deployed position.

In accordance with another aspect of the disclosure, the blocking feature is biased to the blocking position when the slider is moved from the non-deployed position to the deployed position.

In accordance with another aspect of the disclosure, the blocking feature is biased from the blocking position to the non-blocking position when the hook is moved from the striker retaining position to the striker releasing position.

In accordance with another aspect of the disclosure, the blocking feature is biased from the blocking position to the non-blocking position by the release lever when the release lever moves from the rest position to the actuated position.

In accordance with another aspect of the disclosure, the blocking feature engages the lift lever to move the lift lever from the lift lever rest position to the lift lever deployed position as the blocking feature moves from the non-blocking position to the blocking position.

In accordance with another aspect of the disclosure, a pin is provided to extend laterally outwardly from blocking lever into sliding engagement with a lift lever driven surface of the lift lever.

In accordance with another aspect of the disclosure, the pin is brought into blocking engagement with an end blocking surface of lift lever when the lift lever is in the lift lever deployed position.

In accordance with another aspect of the disclosure, the lift lever driven surface of the lift lever is a smooth, arcuate surface, concave surface.

In accordance with another aspect of the disclosure, the slider engages the blocking feature to move the blocking feature from the non-blocking position to the blocking position.

In accordance with another aspect of the disclosure, a pin is provided to extend from the slider into engagement with a driven cam surface of the blocking lever, wherein the pin causes cammed movement of the blocking lever from the non-blocking position to the blocking position in response to movement of the slider from the non-deployed position to the deployed position.

In accordance with another aspect of the disclosure, a hook blocking pawl moveable between a non-blocking, rest position and a blocking position is provided, wherein the hook blocking pawl is brought into blocking engagement with a lock surface of the hook to maintain the hook in the striker retaining position while the actuator is in the actuated position.

In accordance with another aspect of the disclosure, movement of the release lever to its actuated position causes the hook blocking pawl to move from the blocking position to the non-blocking, whereat the hook is moved from the striker retaining position to a striker releasing position while the actuator is in the actuated position.

In accordance with another aspect of the disclosure, the hook blocking pawl is biased toward the blocking position by a biasing member.

In accordance with another aspect of the disclosure, the pedestrian protection system further includes a housing configured to support at least one of the an actuator, slider, hook, and lift lever, the housing having a flange configured to overlie and obstruct the potential upward movement of the hook while in the striker retaining position.

In accordance with another aspect of the disclosure, the pedestrian protection system can be configured to be connected to a latch frame plate of an existing closure latch assembly.

In accordance with another aspect of the disclosure, a method of automatically moving a hood of a motor vehicle from a fully closed position to a partially open, pop-up position in advance of impacting a pedestrian to minimize the potential for injury to the pedestrian upon the pedestrian impacting the hood is provided.

In accordance with another aspect of the disclosure, the method of automatically moving a hood from a closed position to a partially open, pop-up position in advance of impacting a pedestrian includes: powering an actuator and translating a slide cam member with the actuator and causing movement a hook to a striker retaining position, with a first cam surface of the slide cam member, to prevent removal of a striker, fixed to the hood, from the closure latch assembly. Further, moving a pawl lever with a second cam surface of the slide cam member to operably move at least one pawl from a primary lock position to the ratchet releasing position to cause a ratchet to move from a striker capture position to a striker release position. Further yet, moving a lift lever into engagement with the striker with a third cam surface of the slide cam member to move the striker toward the hook, whereat the hood is moved to the pop-up position.

In accordance with another aspect of the disclosure, the method can further include causing the actuator to move the slide member from a non-deployed position along a straight path to a deployed position to bring the first cam surface into engagement with the hook, the second cam surface into engagement with the pawl lever, and the third cam surface into engagement with the lift lever, upon powering the actuator.

In accordance with another aspect of the disclosure, the method can further include pivoting the hook about a hook axis into the striker retaining position via engagement of the first cam surface of the slide member with a hook protrusion extending outwardly from the hook.

In accordance with another aspect of the disclosure, the method can further include pivoting the hook into the striker retaining position prior moving the at least one pawl from to the ratchet releasing position.

In accordance with another aspect of the disclosure, the method can further include moving the pawl lever to the ratchet releasing position prior to moving the lift lever into engagement with the striker.

In accordance with another aspect of the disclosure, the method can further include supporting the lift lever and the pawl lever to pivot about a common axis.

In accordance with another aspect of the disclosure, the method can further include supporting the slider, the hook and the lift lever for pivoting movement within a common plane.

In accordance with another aspect of the disclosure, a method of automatically actuating a closure latch assembly for moving a hood of a motor vehicle from a closed position to a partially open, pop-up position in advance of impacting a pedestrian to minimize the potential for injury to the pedestrian upon impacting the hood, and optionally releasing the hood for movement from the pop-up position to a fully open position, and optionally resetting the closure latch assembly to allow the hood to be moved from the pop-up position to the closed position is provided. The method includes powering an actuator; moving a slide member with the actuator; causing movement a hook from a striker releasing position to a striker retaining position with a first cam surface of the slide member to prevent removal of a striker fixed to the hood from the closure latch assembly; moving a pawl lever with a second cam surface of the slide member to operably move at least one pawl from a primary lock position to the ratchet releasing position to cause a ratchet to move from a striker capture position to a striker release position; moving a lift lever from a lift lever rest position to a lift lever deployed positon in engagement with the striker with a lift lever drive surface of the slide member to move the striker toward the hook, whereat the hood is moved to the pop-up position; and optionally moving a release lever from a rest position to an actuation position and causing the hook to move from the striker retaining position to the striker releasing position, thereby allowing the striker to be removed from the closure latch assembly and the hood to be moved from the pop-up position to the fully open position.

The method can further include moving the release lever from the rest position to the actuation position via manual actuation of a release member.

The method can further include causing a blocking feature to move from a non-blocking positon into a blocking position, whereat the blocking feature forcibly engages a surface of the lift lever to releasably maintain the lift lever in the lift lever deployed position.

The method can further include causing the blocking feature to move from the blocking position to the non-blocking position while moving the release lever from the rest position to the actuation position, whereat the lift lever can be returned to the lift lever rest position to allow the hood to be moved to the closed position.

In accordance with yet another aspect, there is provided a closure latch system for a hood of a motor vehicle for moving a hood fixed to a striker to a pop-up position, including a closure latch assembly comprising one or more latch components, and a pedestrian protection system including an actuator having a non-actuated position and an actuated position, the actuator being configured to translate a slider from a non-deployed position to a deployed position upon moving from the non-actuated position to the actuated position, wherein the slider comprises one or more control surfaces configured to control the one or more components during the slider translating from the non-deployed position to the deployed position.

In accordance with yet another aspect, there is provided a closure latch system for a hood of a motor vehicle for moving a hood fixed to a striker to a pop-up position, including a closure latch assembly comprising one or more latch components, and a pedestrian protection system including an actuator having a non-actuated position and an actuated position, the actuator being configured to move a control element, such as a linearly moveable slider or a rotatable cam element as non-limiting examples, from a non-deployed position to a deployed position upon moving from the non-actuated position to the actuated position, the one or more control surfaces configured to shift the one or more latch components from a normal state to an active pedestrian protection state during movement of the control element from a non-deployed position to a deployed position, the closure latch assembly further including a release lever for shifting the one or more latch components from the active pedestrian protection state to the normal state without causing at least one of the control element and actuator to return to their non-actuated position from their actuated position.

Further areas of applicability will become apparent from the description provided herein. The description and specific examples in this summary are only intended to illustrate certain non-limiting objects, aspects, and embodiments which are not intended to limit the scope of the present disclosure.

BRIEF DESCRIPTION OF THE DRAWINGS

The drawings described herein are only intended to illustrate non-limiting embodiments of a power-operated closure latch assembly and its related structural configuration and functional operation in association with the teachings of the present disclosure. In the drawings.

DETAILED DESCRIPTION OF EXAMPLE EMBODIMENTS

Figure 1A:
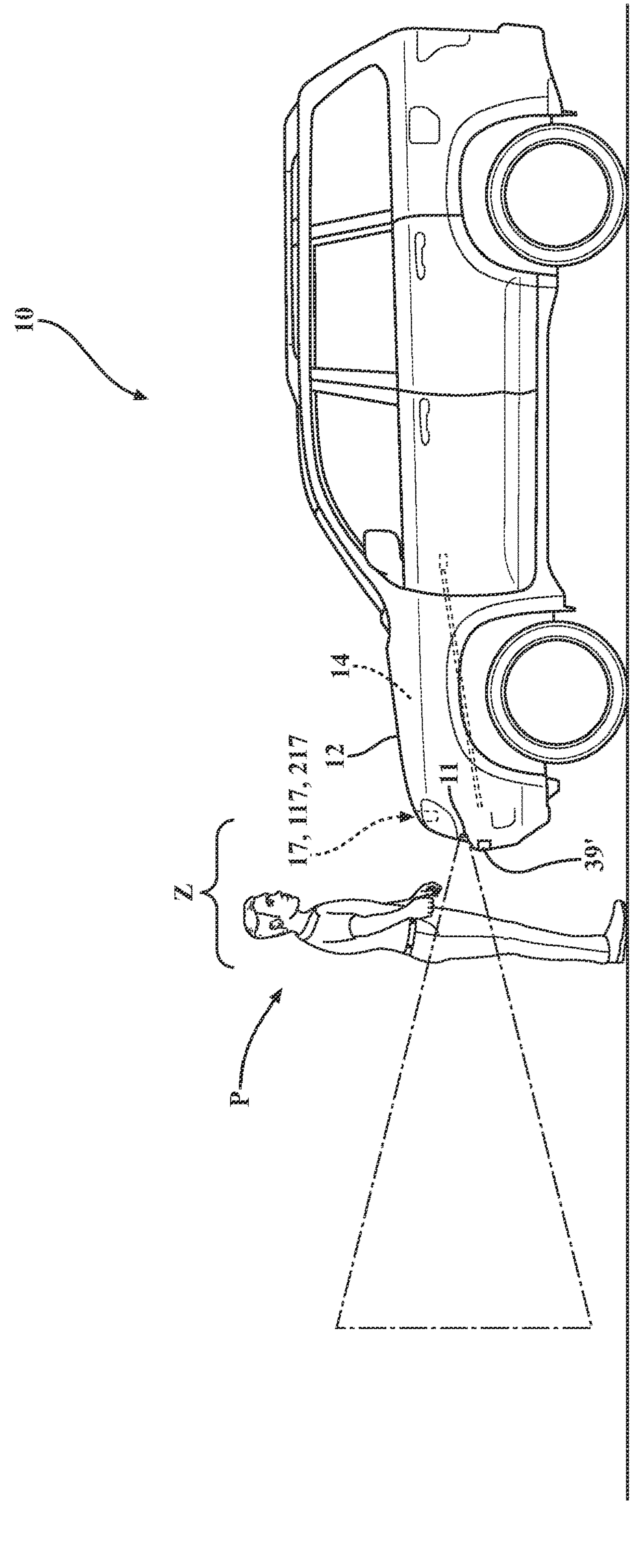
FIGS. 1A-1C illustrate a progressive sequence of a front hood of a motor vehicle be actuated to move from a fully closed position (FIG. 1A) to a pop-up position (FIGS. 1B and 1C) via automatic actuation of a pedestrian protection feature constructed according to one aspect of the present disclosure.

Example embodiments of a power-operated pedestrian protection system for use with a closure latch assembly of a closure latch system of a motor vehicle will now be described more fully with reference to the accompanying drawings. To this end, the example embodiments of the closure latch system and closure latch assembly are provided so that the disclosure will be thorough and will fully convey its intended scope to those who are skilled in the art. Accordingly, numerous specific details are set forth such as examples of specific components, devices, and methods, to provide a thorough understanding of particular embodiments of the present disclosure. However, it will be apparently to those skilled in the art that specific details need not be employed, that the example embodiments may be embodied in many different forms, and that the example embodiments should not be construed to limit the scope of the present disclosure. In some parts of the example embodiments, well-known processes, well-known device structures, and well-known technologies are not described in detail.

In the following detailed description, the expression "closure latch assembly" will be used to generally indicate any power-operated latch device adapted for use with a vehicle closure panel and which is configured to provide at least one of a power cinch feature and a power release feature. Additionally, the expression "closure panel" will be used to indicate any element mounted to a structural body portion of a motor vehicle and which is moveable between a fully-open position and a fully-closed position, respectively opening and closing an access to a passenger or storage compartment of the motor vehicle. Without limitations, closure panel herein is described in relation to front hoods of motor vehicles.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
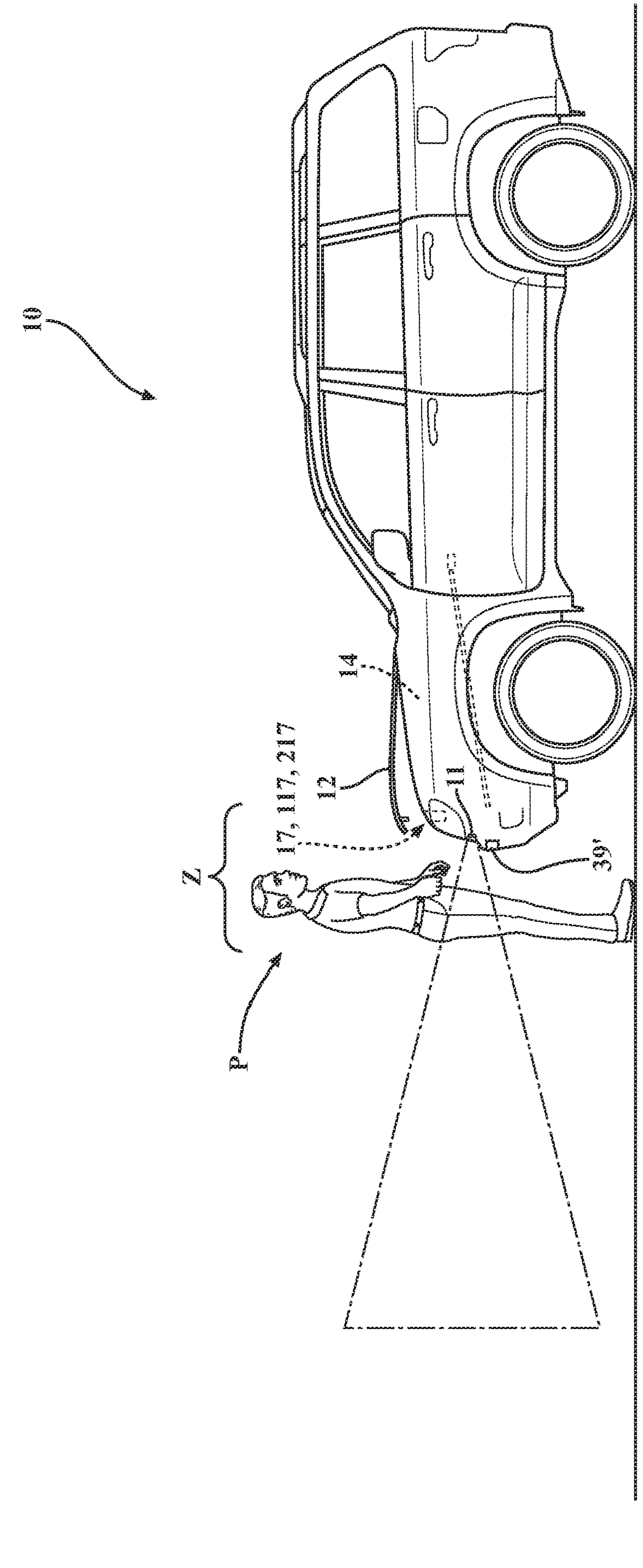
Figure 1C:
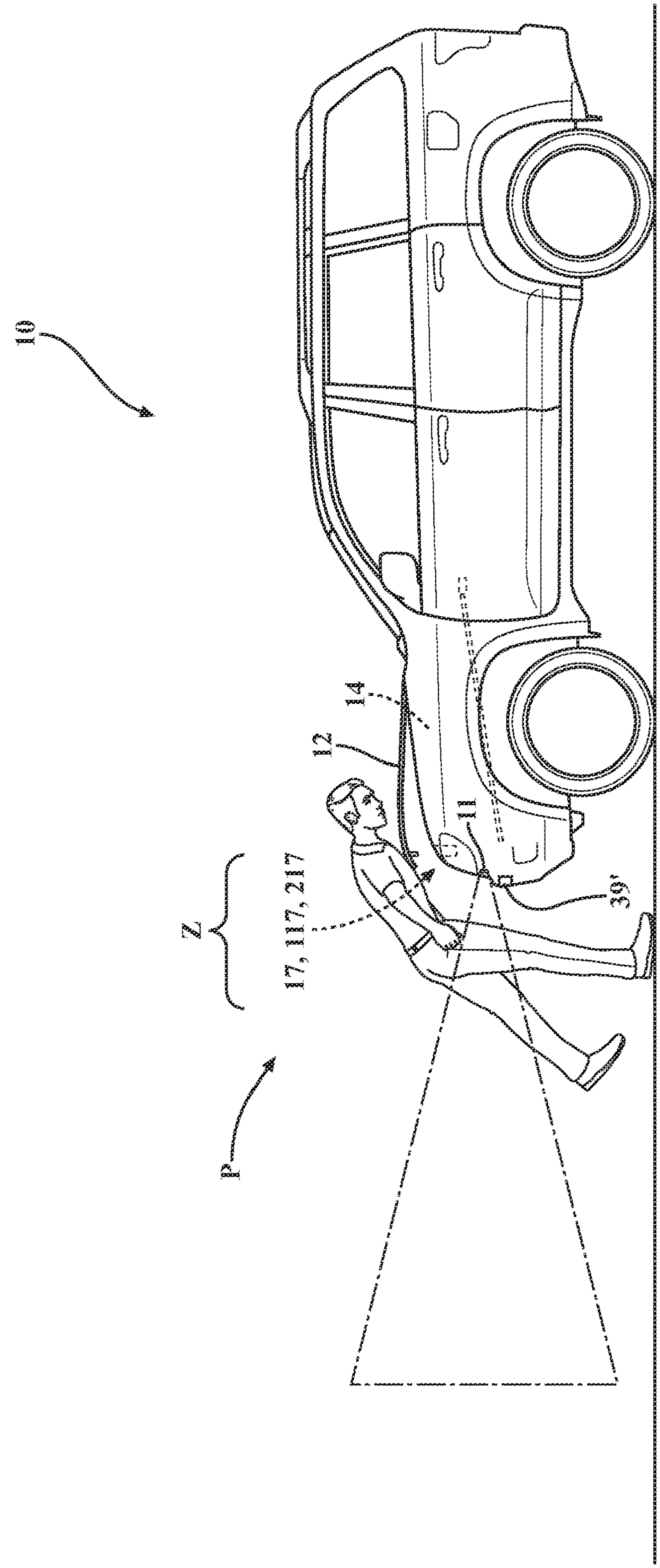

FIGS. 1A-1C illustrates a motor vehicle 10 having a body 11 defining a front compartment 14, which in some embodiments may be an engine compartment and in other embodiments may be a storage compartment, otherwise known as a front trunk, sometimes referred to as "frunk", not having an engine but located in the forward region of the vehicle. In this non-limiting example of motor vehicle 10, a closure panel, configured as a front hood, also referred to simply as hood 12, is pivotably mounted to body 11 for movement relative to the front compartment between a fully-closed position FIG. 1A, and a partially-open or pop-up position FIGS. 1B and 1C. Illustratively, the closure panel 12 is a hood provided at the front of the motor vehicle 10 for enclosing an engine bay or a frunk, also referred to as stowage compartment. Hood 12 may be manually released from within a passenger compartment of vehicle 10 and which functions to actuate a latch release mechanism associated with a closure latch assembly 16 for releasing hood 12 and permitting subsequent movement of hood 12 to its pop-up position or to a fully-open position. Closure latch assembly 16 is, in this non-limiting embodiment, secured to a structural portion of vehicle body 11 adjacent to the front compartment and is configured to releasably engage a striker 22 mounted in fixed relation to an underside of hood 12. The present disclosure is directed to providing a pedestrian protection feature, also referred to as pedestrian protection system (PPS) 20, configured to cooperate in operable communication with closure latch assembly 16 to form a closure latch system 17, with a power release function (automatically actuatable via a sensor/controller system) to automatically move hood 12 to the pop-up position in imminent anticipation of a pedestrian P coming into forcible contact with hood 12. Accordingly, if a pedestrian P impacts the hood 12 after actuation of PPS 20, a cushioned effect of the slightly raised hood 12 is provided, which lessens the impact force to the pedestrian, and can ultimately reduce the potential of the pedestrian P impacting the engine (if present beneath hood 12), thereby reducing the potential for injury to the pedestrian P.

Figure 4:
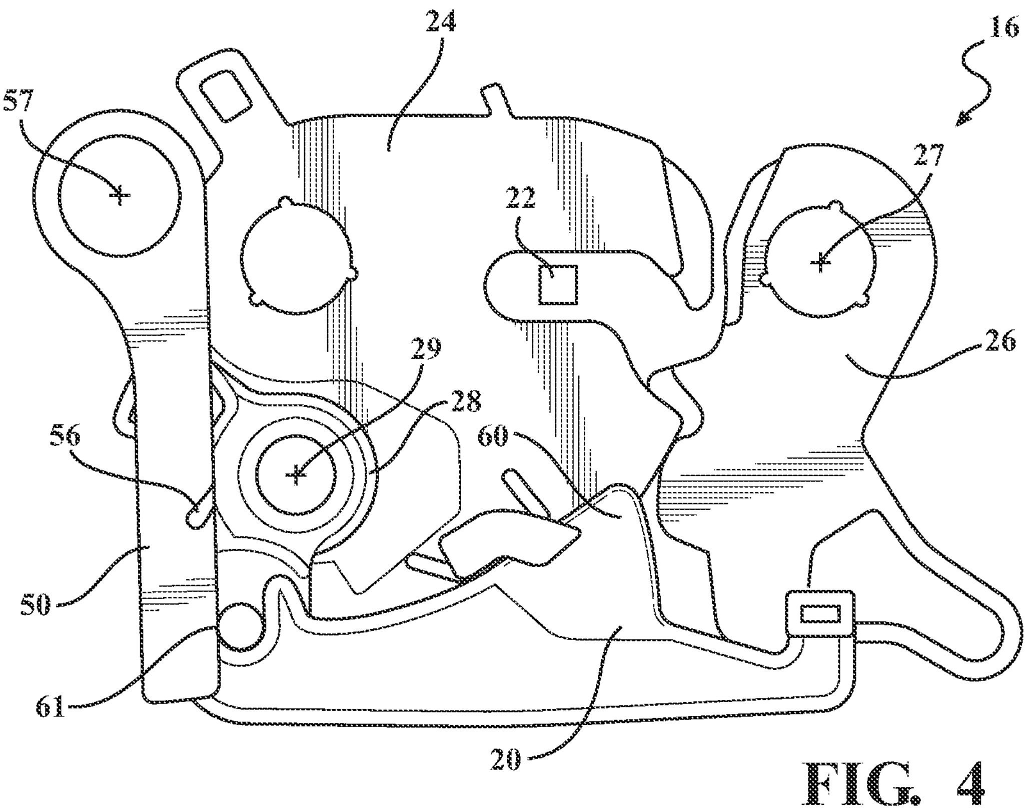
FIG. 4 illustrates a rear side view of a closure latch assembly for use with the pedestrian protection feature of FIG. 2, with the closure latch assembly shown in a striker capture position.
Figure 6:
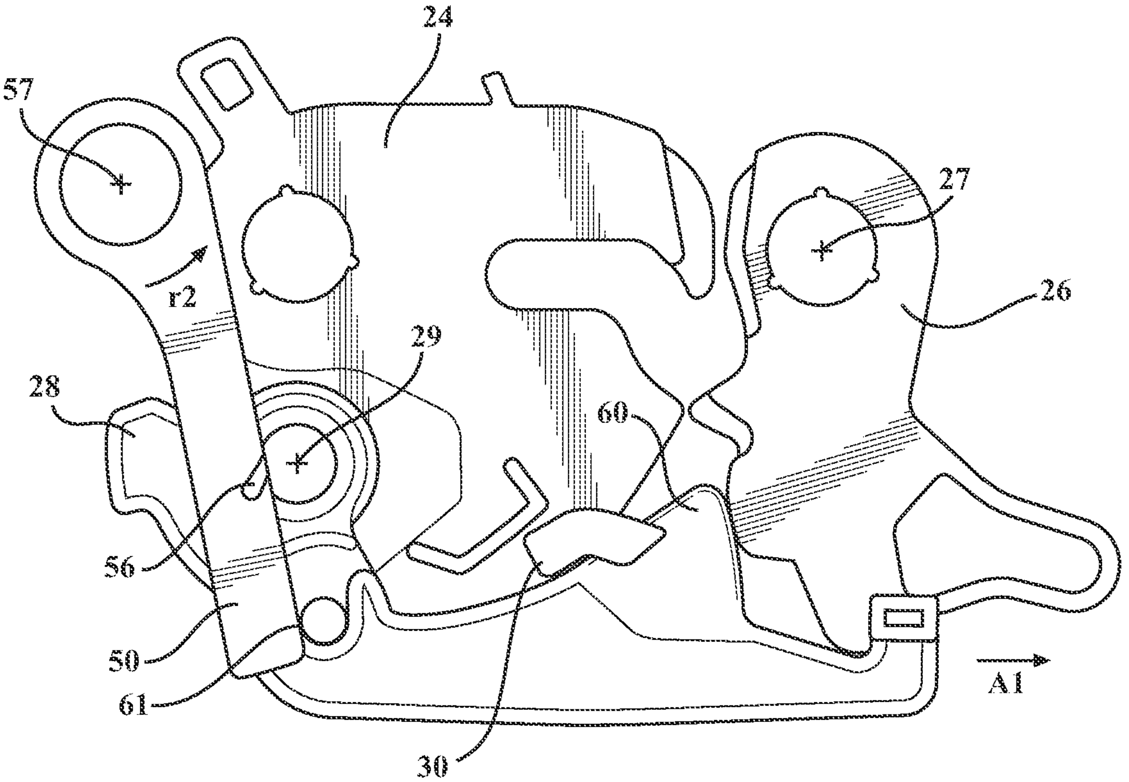
FIG. 6 is a view similar to FIG. 4 showing primary and secondary pawls of the closure latch assembly moved to a ratchet release position via movement of a pawl lever of the pedestrian protection feature in response to a lug of the pawl lever being driven by the slider.

A detailed description of a non-limiting embodiment of a power-operated version of closure latch assembly 16 and closure latch system 17 therewith, constructed in accordance with the teachings of the present disclosure, will now be provided with reference to FIGS. 4 and 6. Closure latch assembly, referred to hereafter as latch 16 includes a ratchet 24, a primary pawl 26, a secondary pawl 28, and a coupling link, also referred to as coupling lever 30. The ratchet 24 is movable between a primary closed position, also referred to as primary striker capture position, a secondary closed position, also referred to as secondary striker capture position, and an open position, also referred to as striker release position, in response to selective movement of the primary and secondary pawls 26, 28 from ratchet retaining positions (see for example FIG. 4) to ratchet releasing positions (see for example FIG. 6). In the primary and secondary closed positions, the ratchet 24 prevents the withdrawal of the striker 22. When in the primary closed position, the ratchet 12 holds the striker 22 relatively deeper within a slot, commonly referred to fishmouth of housing, wherein the hood 12 is in a fully closed state, as compared to when ratchet 24 is in the secondary closed position, wherein the hood 12 is in a partially closed state, but prevented from being moved to the fully open position by ratchet 24. Thus, in the primary closed position the ratchet 24 holds the striker 22 at a first depth in the fishmouth whereat the hood 12 is in a fully closed position, and in the secondary closed position the ratchet 24 holds the striker 22 at a second depth in the fishmouth of the housing whereat the hood 12 is in the partially closed, pop-up position, wherein the first depth is greater than the second depth.

Figure 2:
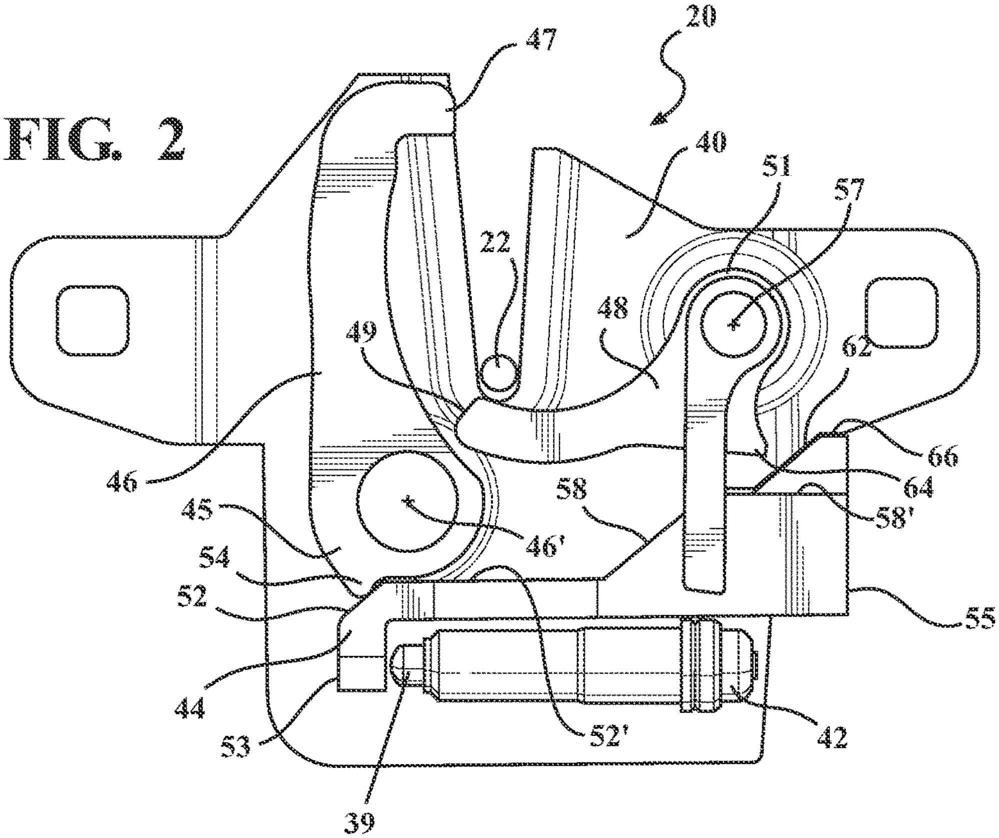
FIG. 2 illustrates a front side view of the pedestrian protection feature constructed according to one aspect of the present disclosure for use with a closure latch assembly of a front hood of a motor vehicle, wherein the pedestrian protection feature is shown in a non-deployed, rest home position.

With reference to FIG. 2, pedestrian protection system 20 is shown in a rest, home position. Pedestrian protection system 20 includes a housing 40 for receipt and support of various components, including a power-operated actuator 42, a slide cam member, also referred to as slide member or slider 44, a striker retention hook, also referred to as hook member or hook 46, a striker lift lever, also referred to as lift lever 48, and a pawl opener, also referred to as pawl lever 50.

Now turning to FIGS. 1A-1C, a sequence events is illustrated showing detection of pedestrian P in a pedestrian protection zone Z and actuation of the power actuator 42 of PPS 20 in response to the detection of pedestrian P in the pedestrian protection zone Z to lessen the impact force experienced by the pedestrian P upon impacting the hood 12 of the motor vehicle 11.

Figure 9:
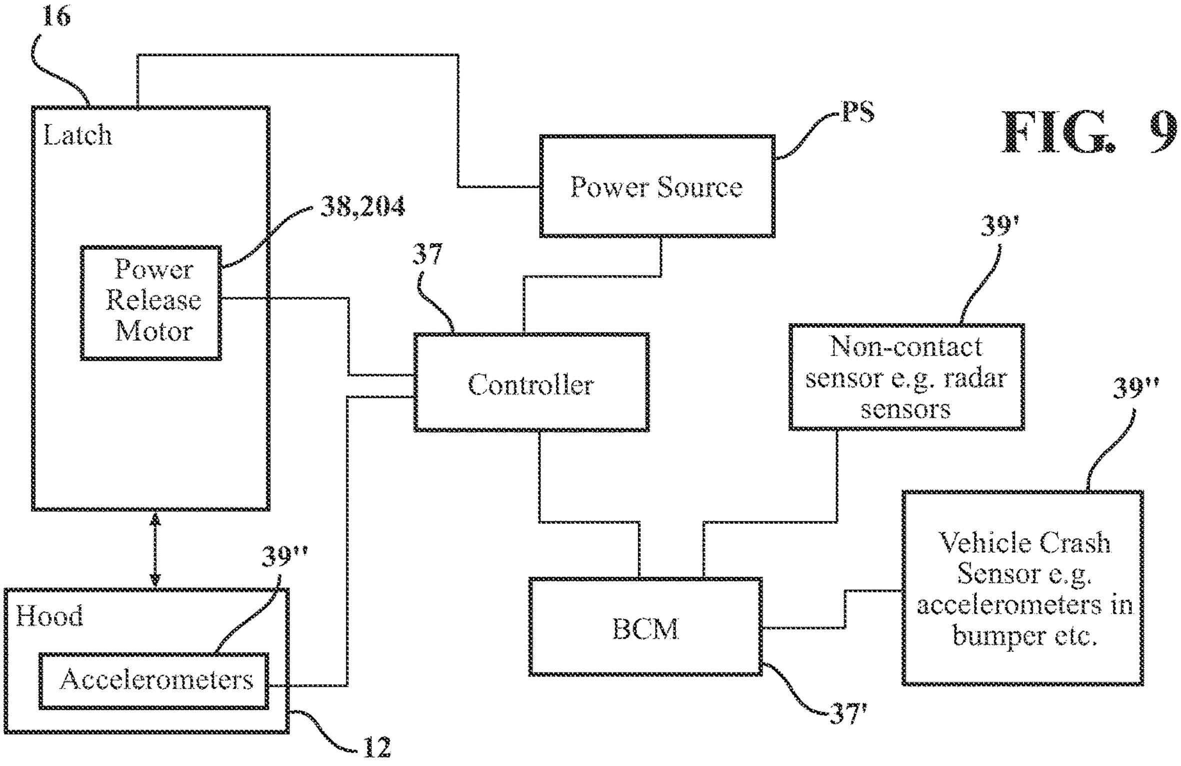
FIG. 9 is a flow diagram illustrating a method of automatically moving a hood of a motor vehicle from a fully closed position to a partially open, pop-up position in advance of impacting a pedestrian.

In FIG. 1A, a pedestrian P is illustrated in the predetermined pedestrian protection zone Z of motor vehicle 11. The range of distance or pattern of pedestrian protection zone Z can be selected as desired, such as between about 0.1 to 2 meters from a front end of motor vehicle 11, by way of example and without limitation. Within or outside of pedestrian protection zone Z, an advanced driver assistance system (ADAS) can be activated to automatically steer and/or brake vehicle 11 as needed to avoid or lessen impact with another vehicle and/or pedestrian P. The ADAS system can be in operable communication with one or more sensors 39', such as non-contact, radar emitting sensor(s) (FIGS. 1A-1C and 9), such as provided in a front end region of motor vehicle 11, by way of example and without limitation, and/or one or more other sensors 39", such as vehicle crash sensors, including accelerometers, radar emitting sensors, located in desired regions of the motor vehicle 10, by way of example and without limitation, as well as with a body control module (BCM), also referred to as vehicle controller 37', and/or a latch controller 37 (FIG. 9).

Upon pedestrian P having entered pedestrian protection zone Z, sensor 39' detects an imminent side or frontal crash/impact with pedestrian P, thus, sensor 39' communicates with vehicle controller 37' and/or directly with latch controller 37 to actuate power actuator 42 of pedestrian protection feature 20 to automatically move slider 44, thereby causing primary and second pawls 26, 28 to move to their ratchet release positions from ratchet retaining positions. Accordingly, ratchet 24 is automatically permitted to move to its striker release position.

Figure 5:
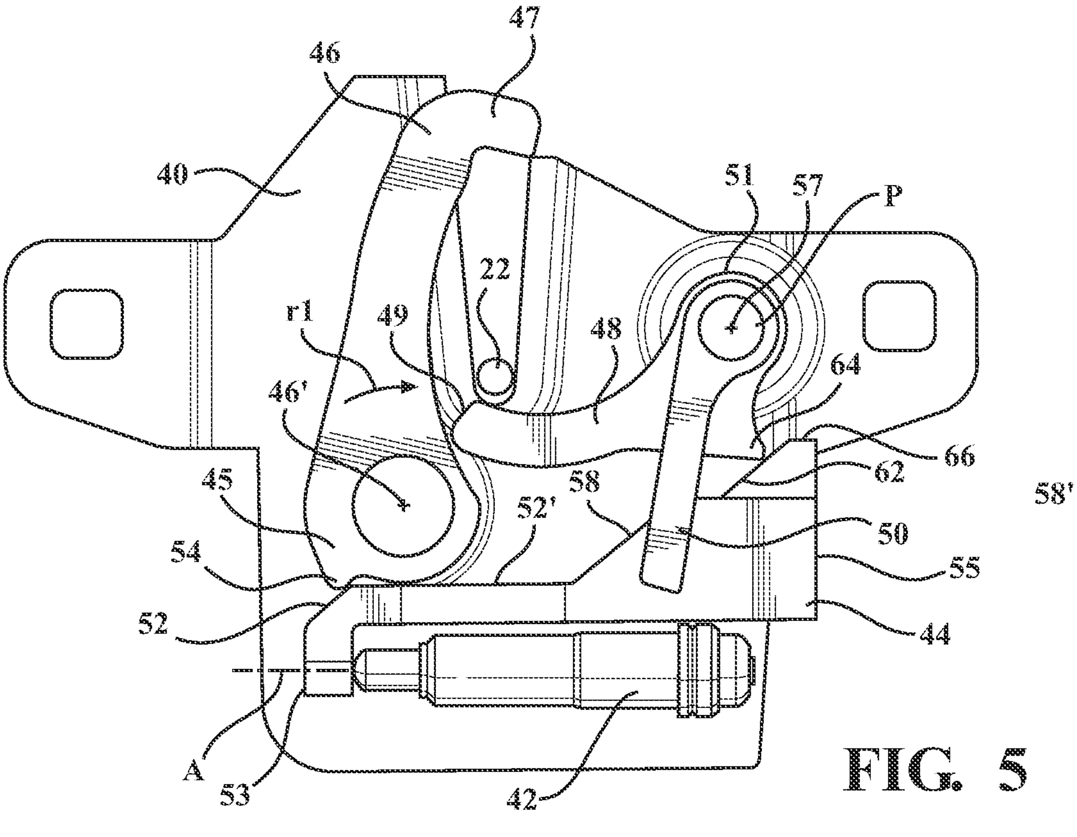
FIG. 5 is a view similar to FIG. 2 showing an actuator moved from a non-actuated position to an initially actuated position to move a slider (slide cam member) from a non-deployed position to an initially deployed position, whereat a hook is caused to move from a non-deployed striker release position to a deployed striker capture position in response to a surface of the slider engaging and driving a surface of the hook, whereat the hook prevents a striker from being released from the closure latch assembly and the pedestrian protection feature.

In more detail, upon sensing an imminent impact with a pedestrian P, such as when the pedestrian P enters a pedestrian protection zone Z (FIG. 1A), the actuator 42 is automatically moved, via actuation from a signal from vehicle controller 37' and/or directly with latch controller 37, to an initially actuated position (FIG. 5) to translate slider 44 from a non-deployed position along a straight path extending along an axis A to an initially deployed position causing hook 46 to move, such as via being pivoted, as indicated by arrow r1, about a hook axis, also referred to as first axis 46', from a striker release position to a striker capture position, also referred to as striker retention position. During initial translation of slider 44 along axis A, a first drive member, also referred to as first cam surface 52 of slider 44, located adjacent a first end 53 of slider 44, is brought into camming engagement with a hook driven member, also referred to as hook protrusion 54 extending outwardly from a first end 45 of hook 46 proximate hook axis 46', to pivot hook 46 clockwise, as viewed in FIG. 5, about hook axis 46' to bring a hook-shaped second or free end 47 into blocking, overlying relation with striker 22, thereby preventing striker 22 from passing by hook free end 47 and being released from the pedestrian protection feature 20. As slider 44 is further translated along axis A, an upper, generally flat first cam surface plateau 52' maintains hook 46 in an actuated position with hook-shaped second end 47 in overlying relation with striker 22.

Figure 3:
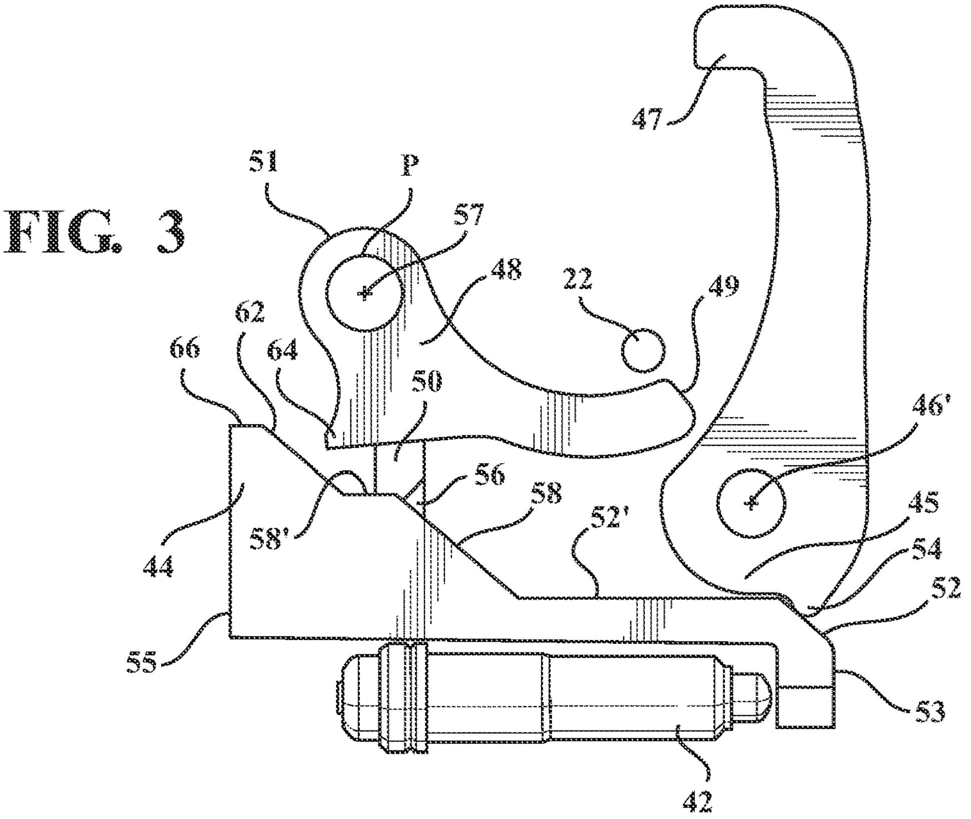
FIG. 3 illustrates a rear side view of the pedestrian protection feature of FIG. 2 with a housing removed therefrom for clarity purposes only, wherein the pedestrian protection feature is shown in a non-deployed, rest home position.

FIG. 6 shows pawls 26, 28 of the closure latch assembly 16 moved from a primary lock position to a ratchet release position via movement, via counterclockwise rotational movement (as viewed in FIG. 6) of a pawl opener lever, referred to hereafter as pawl lever 50, of PPS 20 about a second axis 57, as indicated by arrow r2, in response to a pawl drive member, also referred to as lug 56 (FIG. 3) extending laterally outwardly from pawl lever 50, of the pawl opener lever 50 being driven by a second drive member, also referred to as second cam surface 58 of the slider 44 (FIG. 3 illustrates lug 56 being engaged by second cam surface 58). Second cam surface 58 is shown as a sloped surface located intermediate first end 53 and a second end 55 of slider 44. The sloped surface of second cam surface 58 transitions to a generally flat, second cam surface plateau 58'.

Rotational movement of pawl lever 50 in the direction of arrow r2 causes coupling link 30 to move along the direction of arrow A1 (FIG. 6), whereupon a drive member, shown as a protrusion 60 of coupling link 30, engages and pivots primary pawl 26 about a primary pawl axis 27 to its ratchet release position, while linked connection 61 between coupling link 30 and secondary pawl 28 causes secondary pawl 28 to move pivotably about a secondary pawl axis 29 to its ratchet release position. As slider 44 continues to translate along axis A, lug 56 moves onto second cam surface plateau 58', whereat primary and secondary pawls 26, 28 are maintained in their respective ratchet releasing positions.

Figure 7:
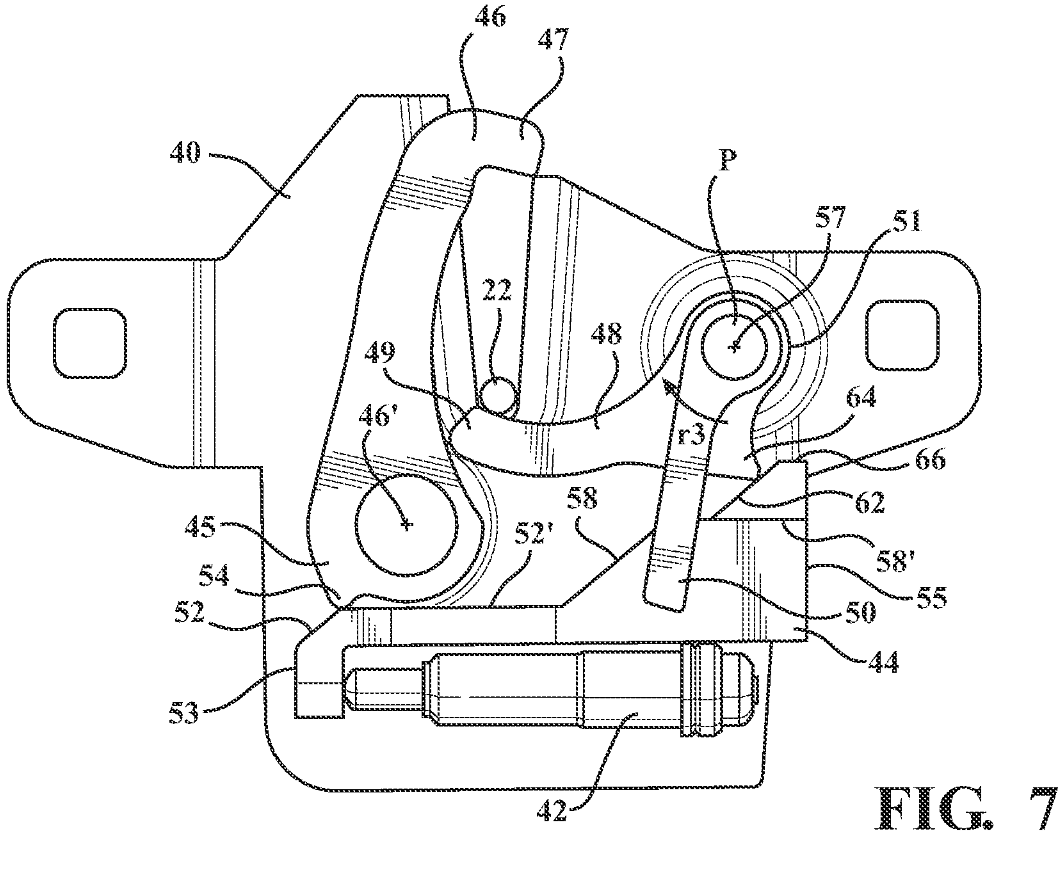
FIG. 7 is a view similar to FIG. 5 showing the actuator moved to an intermediate actuated position to move the slider to an intermediate deployed position causing a lift lever to move into initial engagement with the striker in response to the slider driving a projection of the lift lever.

FIG. 7 shows actuator 42 moved further to an intermediate actuated position to move slider 44 along axis A to an intermediate deployed position. While in the intermediate position, a third cam surface 62 of the slider 44, located adjacent second end 55 of slider 44, is brought into driving engagement with a lift lever projection 64 of the lift lever 48, thereby causing lift lever 48 to move pivotably about axis 57 in the direction of arrow r3. As lift lever 48 pivots about axis 57, a free end 49 of lift lever 48 is brought into initial engagement with striker 22. Lift lever 48 and pawl lever 50 are shown supported about a common pin P for rotation about the common axis 57. Projection 64 is located proximate axis 57 adjacent an end 51 of lift lever 48 opposite free end 49, thereby minimizing the amount of force required to pivot lift lever 48 about axis 57.

Figure 8:
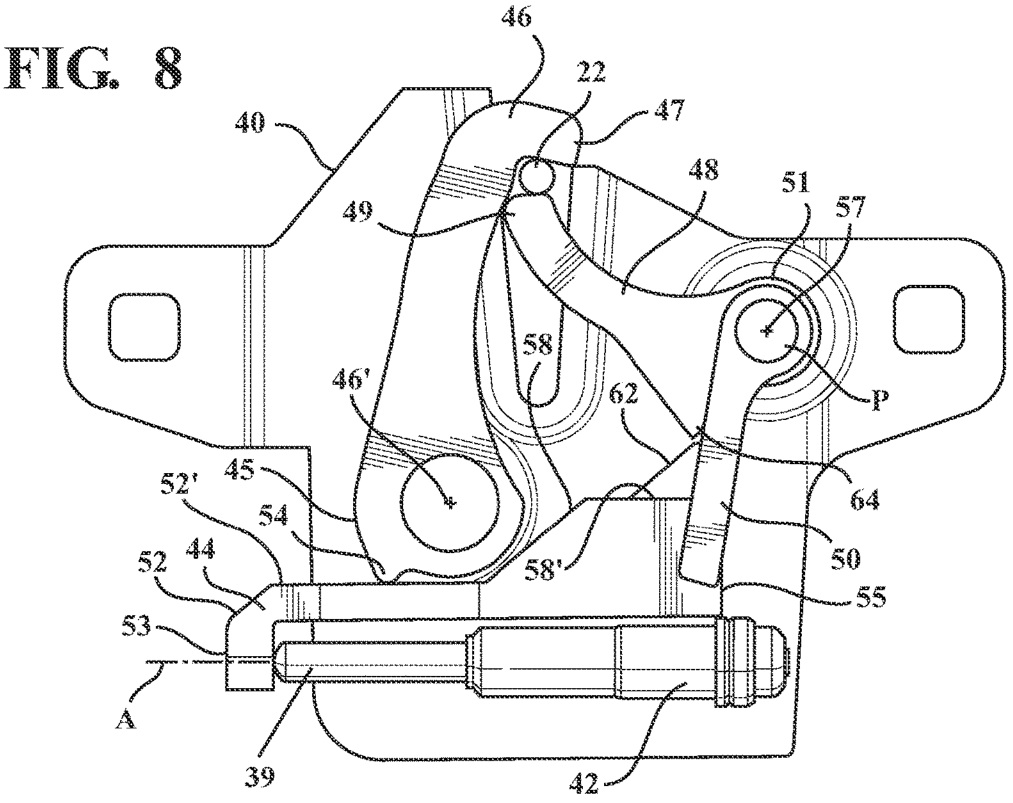
FIG. 8 is a view similar to FIG. 7 showing the actuator moved to a fully actuated position to move the slider to a fully deployed position causing the lift lever to move the striker into engagement with the hook, whereat the front hood of the motor vehicle is moved to the pop-up position of FIGS. 1B and 1C in response to the slider driving the projection of the lift lever.

FIG. 8 shows the actuator 42 moved to a fully actuated position to move slider 44 along axis A to a fully deployed position whereat third cam surface 62, via engagement with lift lever projection 64, causes the lift lever 48 to move the striker 22 upwardly toward the hook-shaped free end 47 into engagement or close proximity with the hook-shaped free end 47 of hook 46. With the hook-shaped free end 47 being maintained in overlying relation with striker 22 via continued engagement of elongate, planar first cam surface plateau 52' with hook protrusion 54, hook 46 prevents striker 22 from being released from pedestrian protection feature 20 and the front hood 12 of the motor vehicle 10 is moved to, and maintained in, the pop-up position (FIGS. 1B and 1C). Lift lever projection 64 is held in the fully deployed, pop-up position on a generally flat third cam surface plateau or stop surface 62' adjacent second end of slider 44 until desired to be moved therefrom, such as in a reset operation.

Slider 44, hook 46 and lift lever 48 are generally coplanar with one another, which allows hook projection 54 to remain in engagement with first cam surface plateau 52' as second cam surface 58 engages lug 56 and maintains lug 56 on second cam surface plateau 58', while third cam surface 62 engages lift lever projection 64 and maintains lift lever projection 64 on third cam surface plateau 62' upon translating slider 44 along the straight axis A to its fully deployed position. The aforementioned arrangement and interrelation of slider 44, hook 46 and lift lever 48 provides a compact structure, thereby minimizing the amount of space needed for incorporation into closure latch system 17. As illustrated, second cam surface plateau 58' is slightly off-set in lateral relation from a plane along which first cam surface plateau 52' and third cam surface plateau 62' are aligned.

Figure 10:
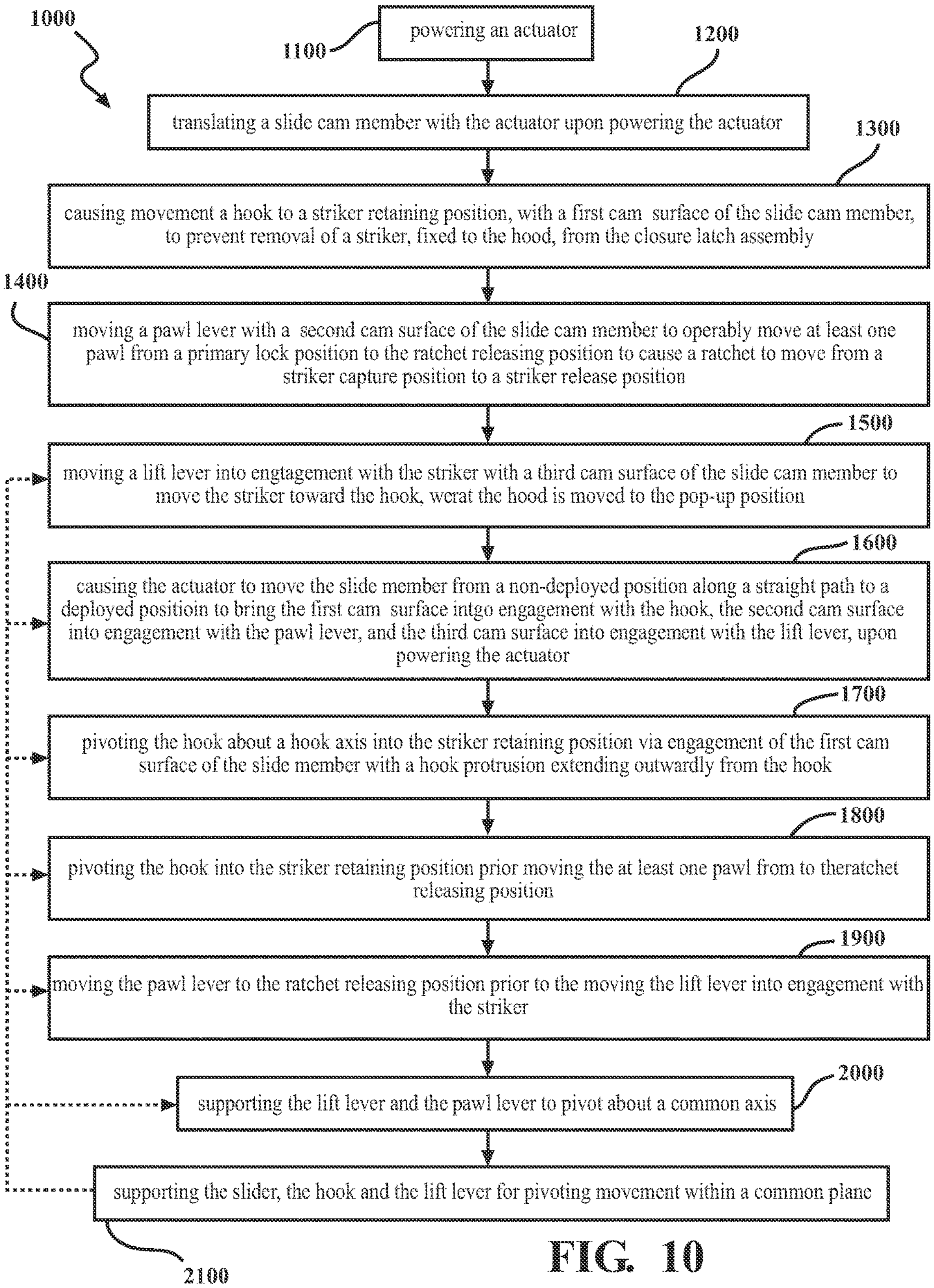
FIG. 10 is another flow diagram illustrating a method of automatically moving a hood of a motor vehicle from a fully closed position to a partially open, pop-up position in advance of impacting a pedestrian
Figure 11:
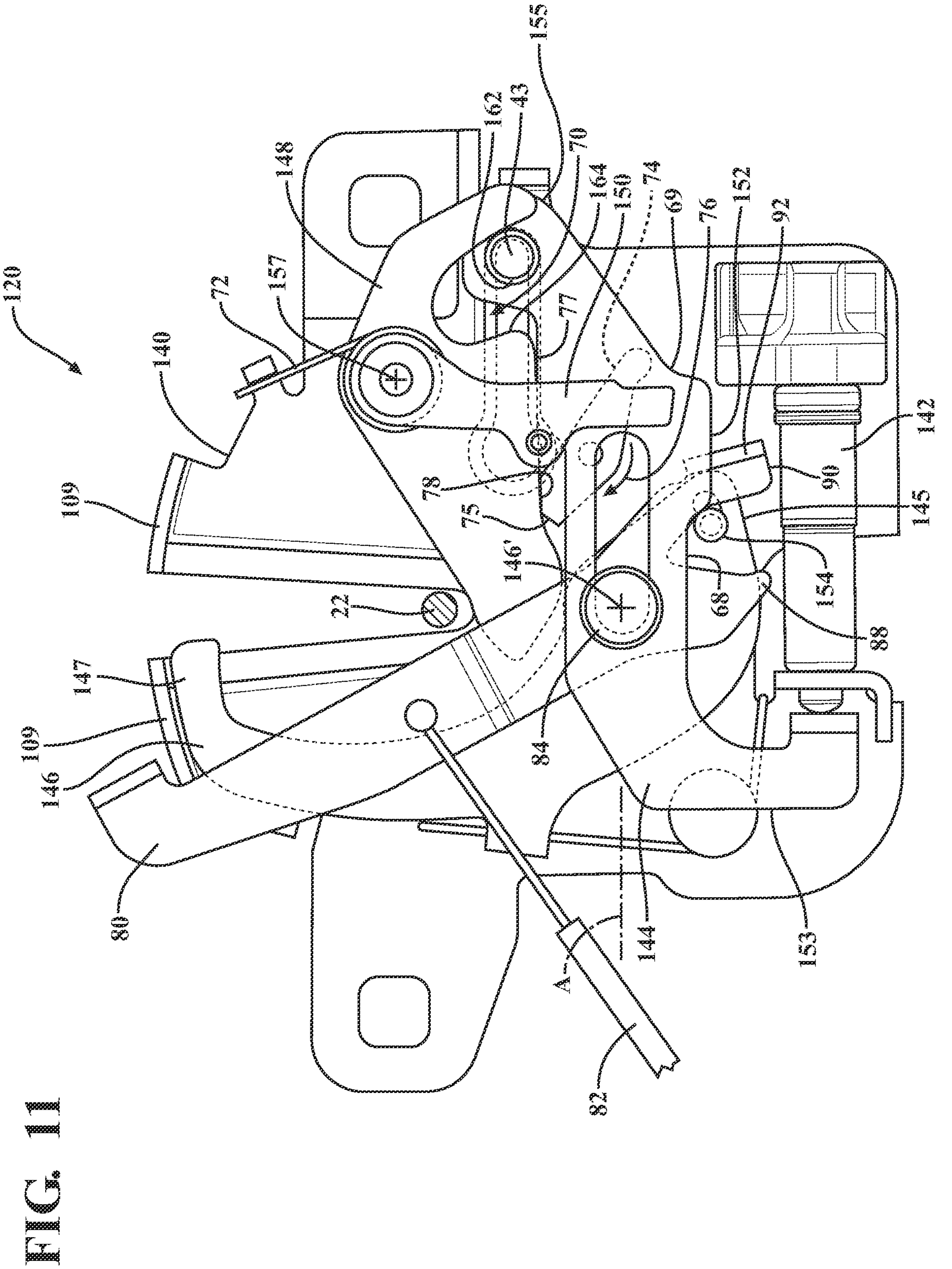
FIG. 11 illustrates a front side view of the pedestrian protection feature constructed according to another aspect of the present disclosure for use with a closure latch assembly of a front hood of a motor vehicle, wherein the pedestrian protection feature is shown in a non-deployed, rest home position.

In accordance with another aspect of the disclosure, FIG. 10 illustrates steps of a method 1000 of automatically moving a hood 12 of a motor vehicle 11 from a closed position to a partially open, pop-up position in advance of impacting a pedestrian P is provided. The method 1000 includes: a step 1100 of powering an actuator 42 and a step 1200 of translating a slide cam member 44 with the actuator 42 and a step 1300 of causing movement a hook 46 to a striker retaining position, with a first cam surface 52 of the slide cam member 44, to prevent removal of a striker 22, fixed to the hood 12, from the closure latch assembly 16. Further, a step 1400 of moving a pawl lever 50 with a second cam surface 58 of the slide cam member 44 to operably move at least one pawl 26, 28 from a primary lock position to the ratchet releasing position to cause a ratchet 24 to move from a striker capture position to a striker release position. Further yet, a step 1500 of moving a lift lever 48 into engagement with the striker 22 with a third cam surface 62 of the slide cam member 44 to move the striker 22 toward the hook 46, whereat the hood 12 is moved to the pop-up position.

In accordance with another aspect of the disclosure, the method 1000 can further include a step 1600 of causing the actuator 42 to move the slide member 44 from a non-deployed position along a straight path to a deployed position to bring the first cam surface 52 into engagement with the hook 46, the second cam surface 58 into engagement with the pawl lever 50, and the third cam surface 62 into engagement with the lift lever 48, upon powering the actuator 42.

In accordance with another aspect of the disclosure, the method 1000 can further include a step 1700 of pivoting the hook 46 about a hook axis 46' into the striker retaining position via engagement of the first cam surface 52 of the slide member 44 with a hook protrusion 54 extending outwardly from the hook 46.

In accordance with another aspect of the disclosure, the method 1000 can further include a step 1800 of pivoting the hook 46 into the striker retaining position prior moving the at least one pawl 26, 28 from to the ratchet releasing position.

In accordance with another aspect of the disclosure, the method 1000 can further include a step 1900 of moving the pawl lever 50 to the ratchet releasing position prior to moving the lift lever 48 into engagement with the striker 22.

In accordance with another aspect of the disclosure, the method 1000 can further include a step 2000 of supporting the lift lever 48 and the pawl lever 50 to pivot about a common axis 57.

In accordance with another aspect of the disclosure, the method 1000 can further include a step 2100 of supporting the slider 44, the hook 46 and the lift lever 48 for pivoting movement within a common plane.

In FIGS. 11-15, a pedestrian protection system (PPS) 120 constructed in accordance with another aspect of the disclosure present disclosure is shown, wherein the same reference numerals, offset by a factor of 100, are used to identify similar features as discussed above for PPS 20. PPS 120 is configured to cooperate in operable communication with closure latch assembly 16, as discussed above for PPS 20, to form a closure latch system 117, with a power release function (automatically actuatable via a sensor/controller system) to automatically move hood 12 to the pop-up position in imminent anticipation of a pedestrian P coming into forcible contact with hood 12, as discussed above for closure latch system 17. Discussion hereafter is directed to PPS 120, with it to be understood that the closure latch assembly 16 of closure latch system 117 is the same as discussed above for closure latch system 17.

PPS 120 includes similar features discussed above with regard to PPS 20, including a PPS housing 140, also referred to as frame plate or plate, an actuator 142, as slider 144, a hook 146, a lift lever 148, and a pawl lever 150. These features, as discussed in more detail hereafter, function similarly as discussed above for the corresponding features of PPS 20.

The actuator 142 has a non-actuated position (FIGS. 11 and 15A) and an actuated position (FIGS. 12-14 and 15B-15D). The actuator 142 is configured to translate slider 144 from a non-deployed position to a deployed position upon moving from the non-actuated position to the actuated position to cause hook 146 to move into a striker retaining position to prevent removal of the striker 22 from the closure latch assembly 16 and to move lift lever 148 from a lift lever rest position into engagement with the striker 22 to a lift lever deployed position to move the striker 22 into engagement with the hook 146, whereat the hood 12 is moved to the pop-up position, thereby providing a pedestrian protection feature via an enhanced cushion provided by hood 12.

In more detail, as discussed above, upon sensing an imminent impact with a pedestrian P, the actuator 142 is automatically moved, via actuation from a signal from vehicle controller 37' and/or directly with latch controller 37, to the actuated position (FIGS. 12 and 13) to translate slider 144 from a non-deployed position along a straight path extending along an axis A to the deployed position. To facilitate straight translating movement of slider 144, housing 140 can have a guide feature, such as straight slot 41 (FIG. 12C), by way of example and without limitation, configured for receipt of a protrusion or pin 43 of slider 144 therein for guided translation therethrough. Translation of slider 144 to the deployed position causes hook 146 to move, such as via being pivoted, as indicated by arrow r1 (FIG. 12), about a hook axis, also referred to as first axis 146', from a striker release position to a striker capture position, also referred to as striker retention position. To facilitate releasably holding slider 144 in the deployed position when desired, lift lever 148 can be provided having a stop member or stop surface fixed thereto, shown as a protrusion 38 formed as a monolithic piece of material with lift lever 148. Stop surface 38 is shown as confronting pin 43 of slide member 144, such that as long a blocking feature 74 is in locked engagement with lift lever 148, slider 144 is held in the deployed position. The slider 144 has a rest surface 68 arranged for receipt of a driven feature 154 of hook 146 while the actuator 142 is in the non-actuated position, whereat the hook 146 is in the striker releasing position. During translation of slider 144 along axis A, a first drive member, also referred to as first cam surface 152 of slider 144, located between a first end 153 of slider 144 and a second end 155 of slider 144, is brought into camming engagement with hook driven feature or member, also referred to as hook protrusion 154 extending outwardly adjacent a first end 145 of hook 146 proximate hook axis 146', to pivot hook 146 clockwise, as viewed in FIG. 12, about hook axis 146' to bring a hook-shaped second or free end 147 into blocking, overlying relation with striker 22, thereby preventing striker 22 from passing by hook free end 147 and being released from the pedestrian protection feature 120 and releasably maintaining hook 146 in an actuated position with hook-shaped second end 147 in overlying relation with striker 22. Thereafter, when desired to release hood 12 from the pop-up position, whereat hook 146 is in striker retaining position, to the fully open position, hook protrusion 154 can be moved by a release lever 80, while the actuator 142 remains in the actuated position, to an over-travel surface 69 of slider 144 arranged for receipt of the hook protrusion 154, whereat the hook 146 is moved to the striker releasing position. The rest surface 68 is shown extending from a first end 71 of the cam surface 152 and the over-travel surface 69 is shown extending from a second end 73 of the first cam surface 152 opposite the first end 71, and thus, first cam surface 152 extends between the rest surface 68 and the over-travel surface 69.

Pawls 26, 28 of the closure latch assembly 16 are moved from a primary lock position to a ratchet release position via movement, via clockwise rotational movement (as viewed in FIG. 12) of pawl lever 150 about a second axis 157 in response to a pawl drive member, also referred to as lug 156 extending laterally outwardly from pawl lever 150, of the pawl opener lever 150 being driven by a second drive member, also referred to as second cam surface 158 of the slider 144. Second cam surface 158 is shown as a raised plateau generally opposite first cam surface 152, also formed as a raised plateau.

Rotational movement of pawl lever 150 in the clockwise direction causes coupling link 30 to move along the direction of arrow A1 (FIG. 6), whereupon a drive member, shown as a protrusion 60 of coupling link 30, engages and pivots primary pawl 26 about a primary pawl axis 27 to its ratchet release position, while linked connection 61 between coupling link 30 and secondary pawl 28 causes secondary pawl 28 to move pivotably about a secondary pawl axis 29 to its ratchet release position. As slider 144 translates along axis A, lug 156 moves onto second cam surface 158, whereat primary and secondary pawls 26, 28 are maintained in their respective ratchet releasing positions. Slider 144 is an example of a control element which can be moved by an actuator 42 to transition the closure latch assembly 16 from a normal state (see for example FIG. 2) to an active pedestrian protection state (see for example FIG. 8).

As actuator 42 is moved to the actuated position and slider 144 is moved along axis A to the deployed position (FIGS. 12-14 and 15A-15C), a lift lever driven surface 164 of lift lever 148 is engaged and driven by a lift lever drive surface 162 slider 144, wherein the lift lever drive surface 162 moves the lift lever 148 into engagement with the striker 22 to move the striker 22 into engagement with the hook 146. Lift lever driven surface 164 can be formed along a surface of a recess 70 of the lift lever 148, and the lift lever drive surface 162 can be formed by a protrusion, such as a pin, lug or the like, extending outwardly from the lift lever 148, shown as extending transversely in laterally outwardly extending relation therefrom. Lift lever 148 is caused to move pivotably about axis 157 in a clockwise direction against a bias, such as imparted by a spring member 72, wherein spring member 72 acts to bias lift lever 148 toward a non-deployed, home position (FIGS. 11 and 15A) absent being lifted forcibly against the bias. Lift lever 148 and pawl lever 150 are shown supported about a common pin P for rotation about the common axis 157. Lift lever driven surface 164 is located proximate axis 157, thereby minimizing the amount of force required by lift lever drive surface 162 to pivot lift lever 148 about axis 157. Accordingly, the force required to be exerted by actuator 142 on slider 144 can be minimized.

Figure 12:
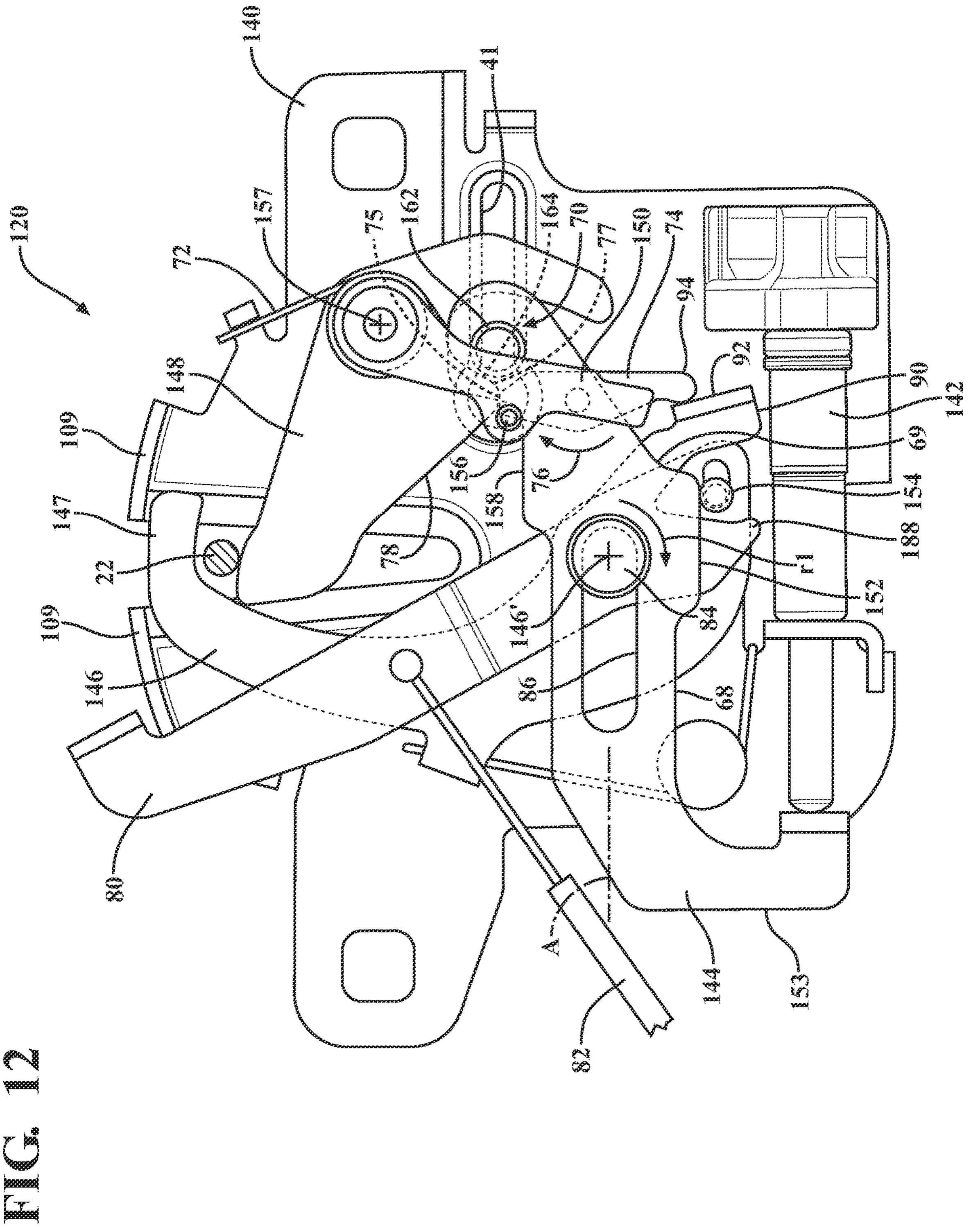
FIG. 12 is a view similar to FIG. 11 showing an actuator of the pedestrian protection feature moved to a fully actuated position to move a slider to a fully deployed position causing a lift lever to move a striker into engagement with a hook, whereat the front hood of the motor vehicle is moved to the pop-up position of FIGS. 1B and 1C.
Figure 12A:
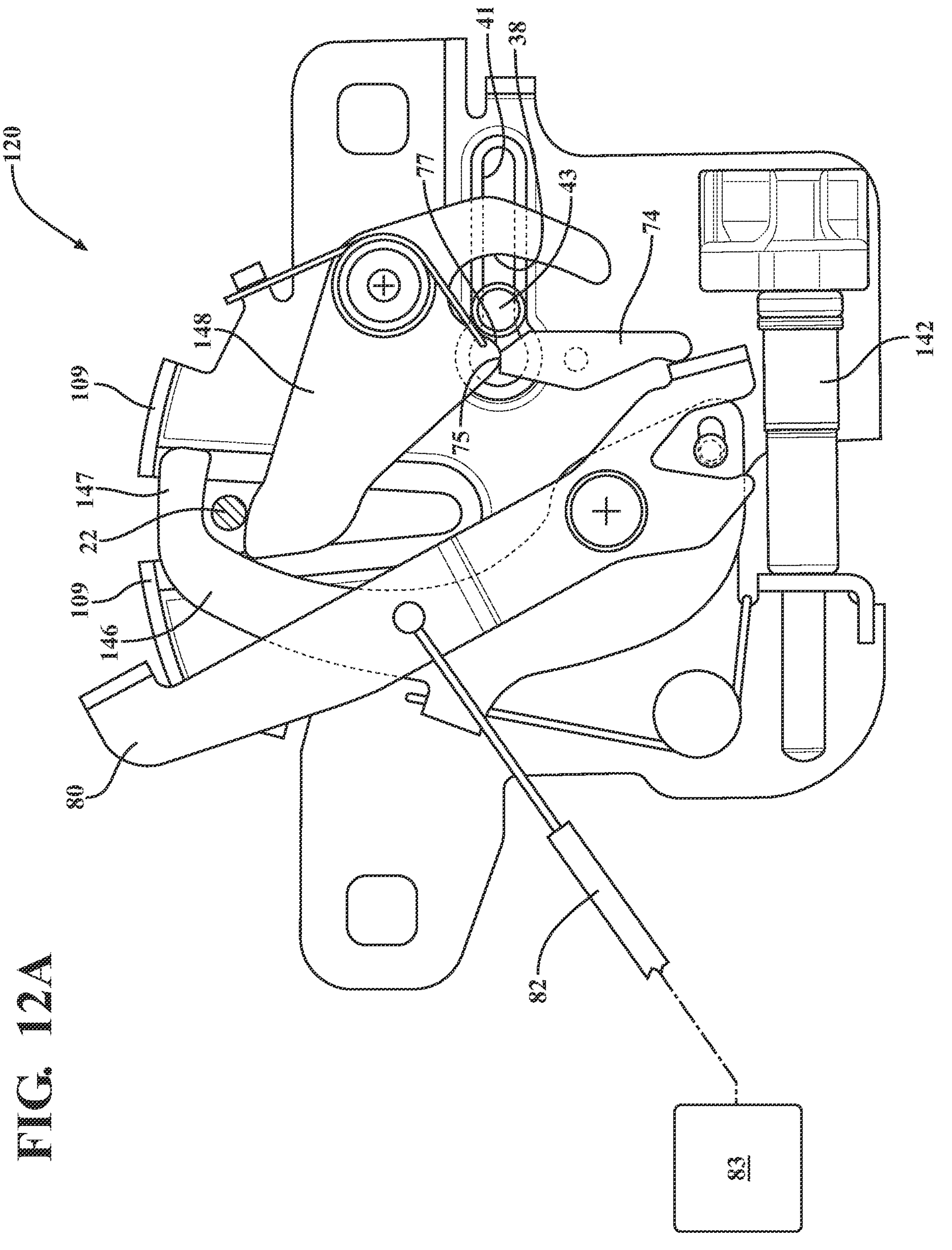
FIG. 12A is a view similar to FIG. 12 illustrating a view with the slider removed for clarity purposes only to show aspects associated with a lift lever of the pedestrian protection feature in accordance with further aspects of the disclosure.
Figure 12B:
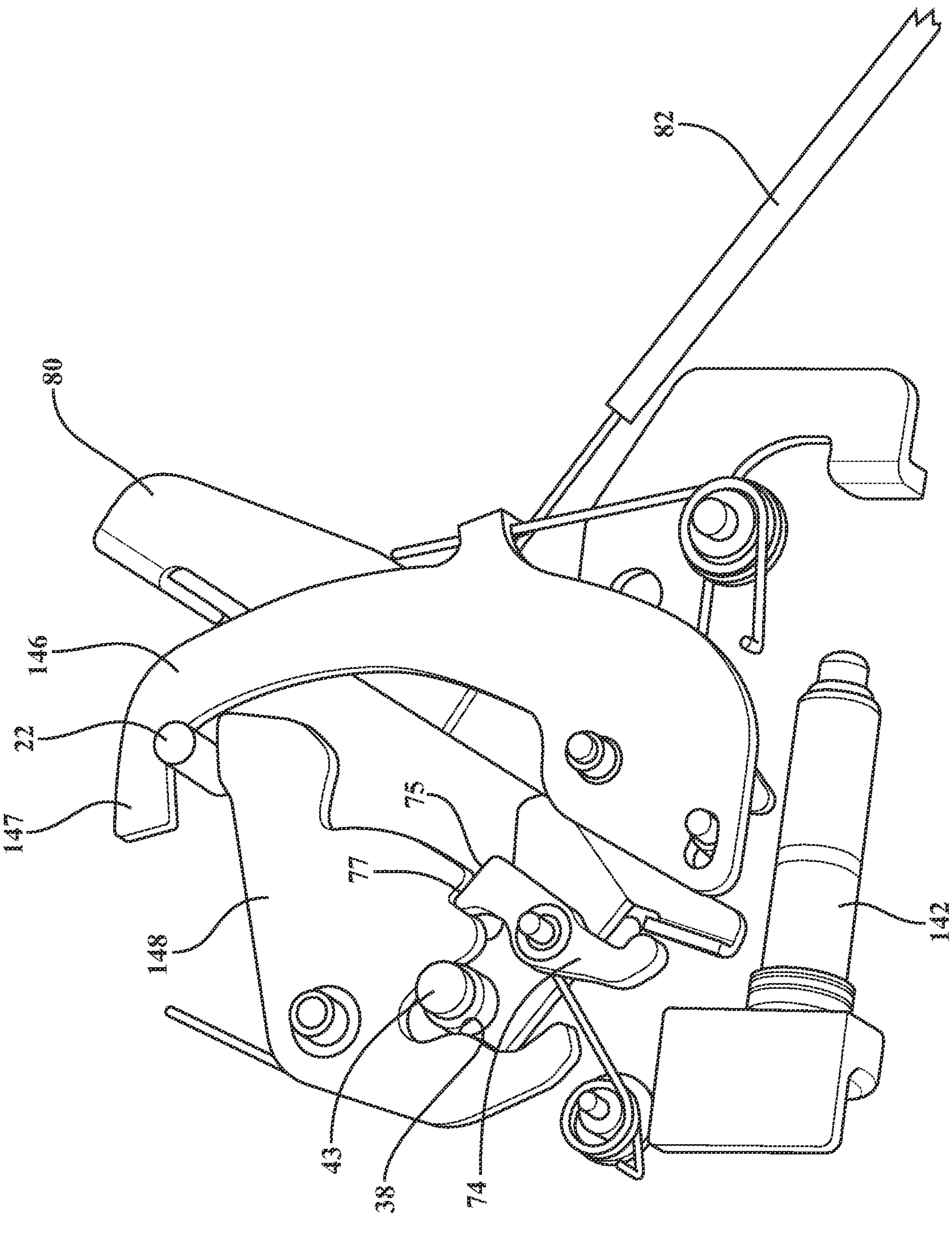
FIG. 12B is a view similar to FIG. 12A looking from an opposite side.
Figure 12C:
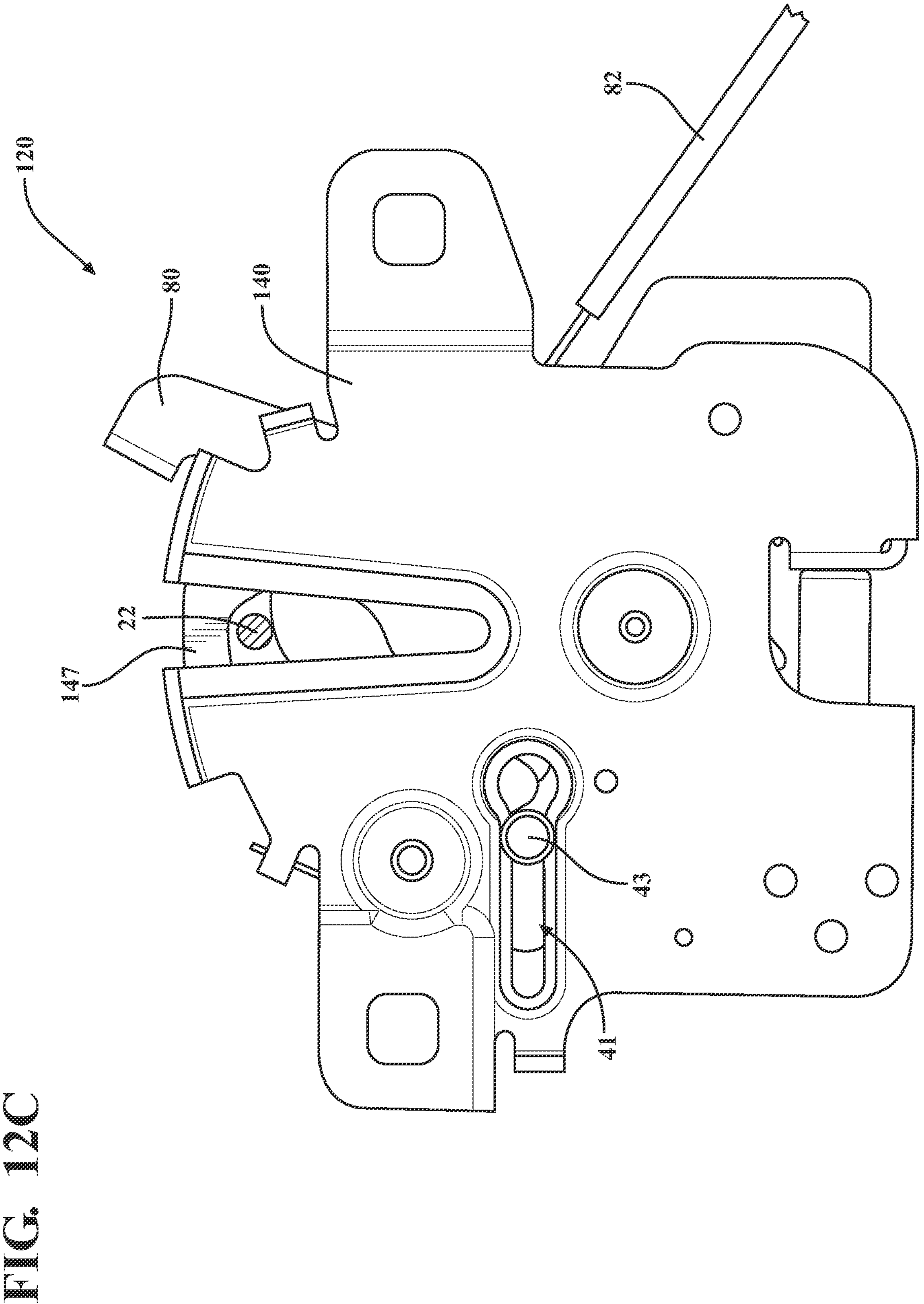
FIG. 12C is a view similar to FIG. 12 looking from an opposite side of a housing of the pedestrian protection feature.
Figure 13:
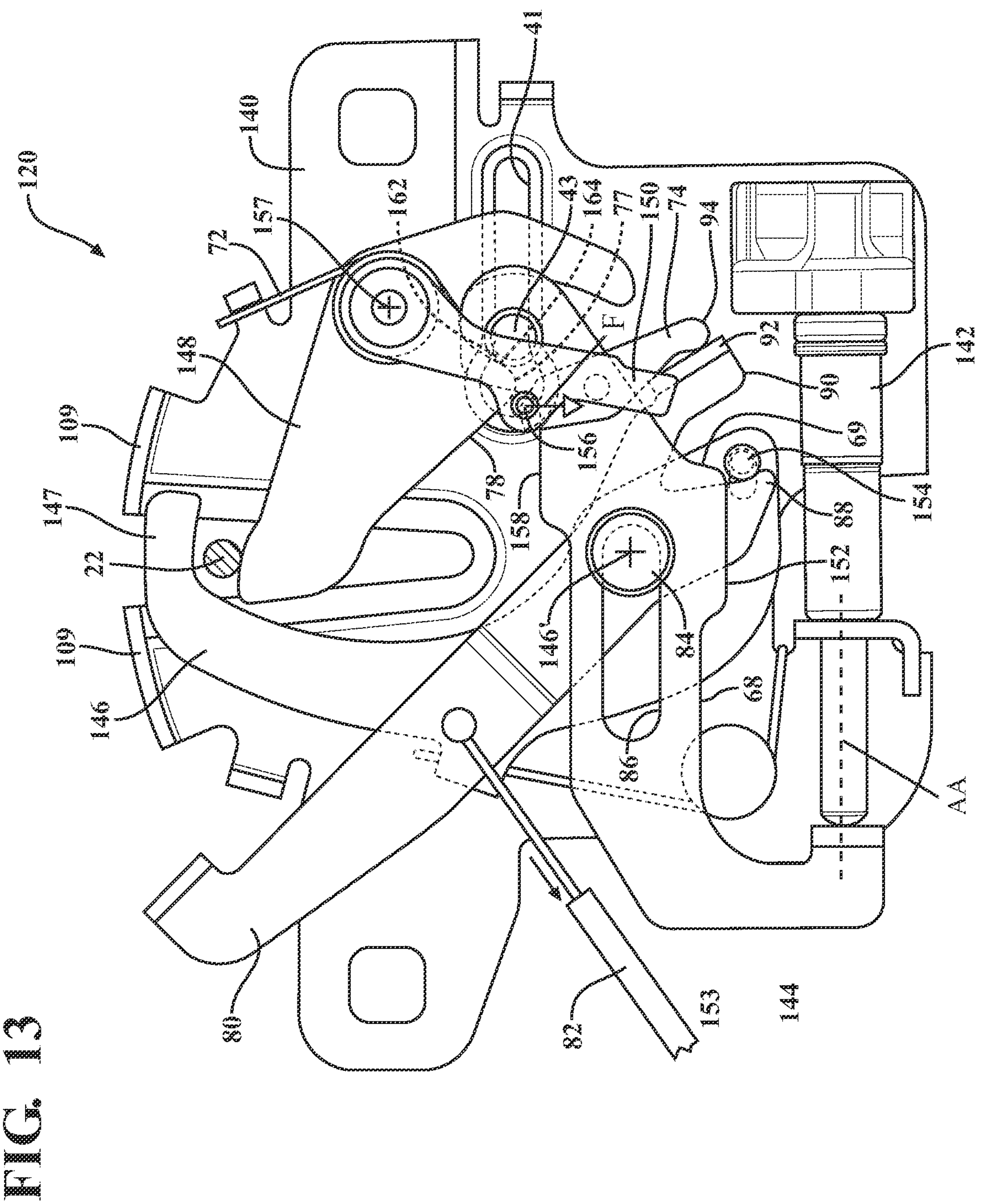
FIG. 13 is a view similar to FIG. 12 showing an initial actuation of a release lever for moving the hook from a striker retaining position to a striker releasing position.
Figure 14:
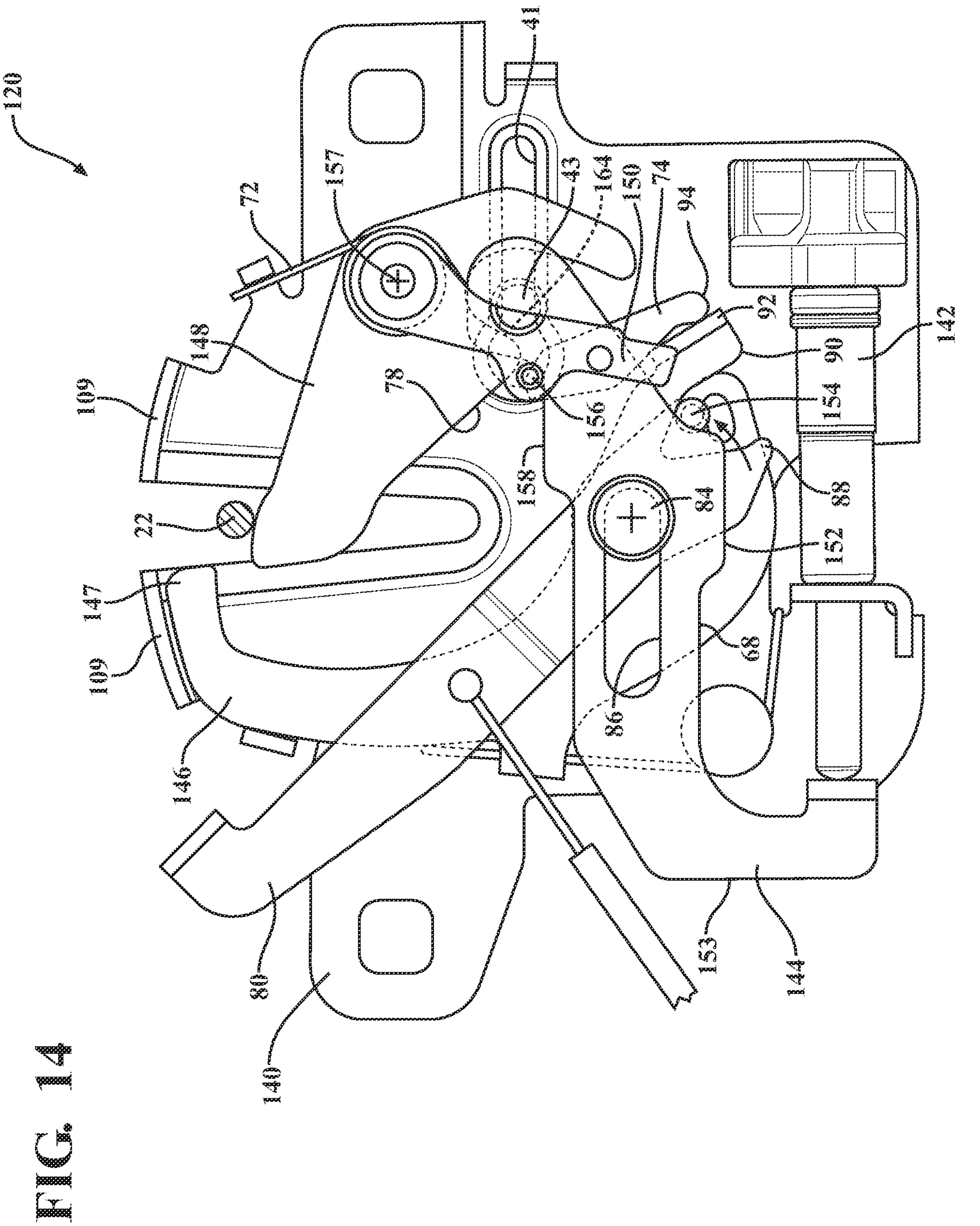
FIG. 14 is a view similar to FIG. 13 showing completion of actuation of the release lever with the hook moved to the striker releasing position.
Figure 15A:
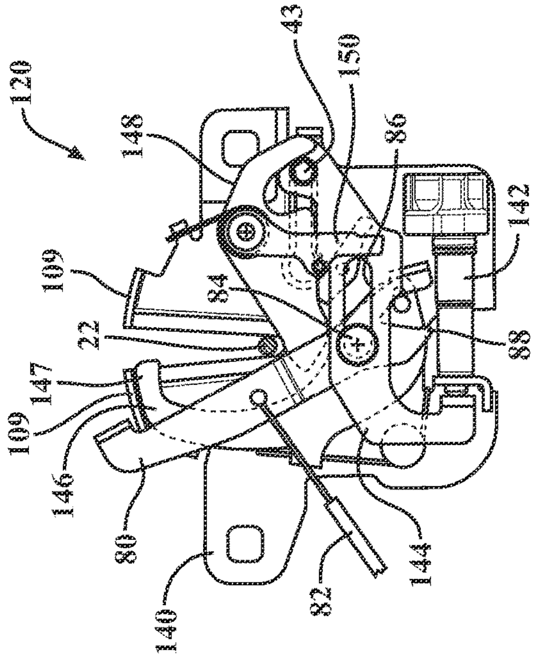
FIGS. 15A-15D illustrate a sequence of actuating the actuator of the pedestrian protection feature to move the hook to the striker retaining position and the lift lever to a lift lever deployed position to move the hood to the pop-up position and then actuating the release lever to move the hook from the striker retaining position to the striker releasing position to allow the hood to be moved from the pop-up position to an open position.
Figure 15B:
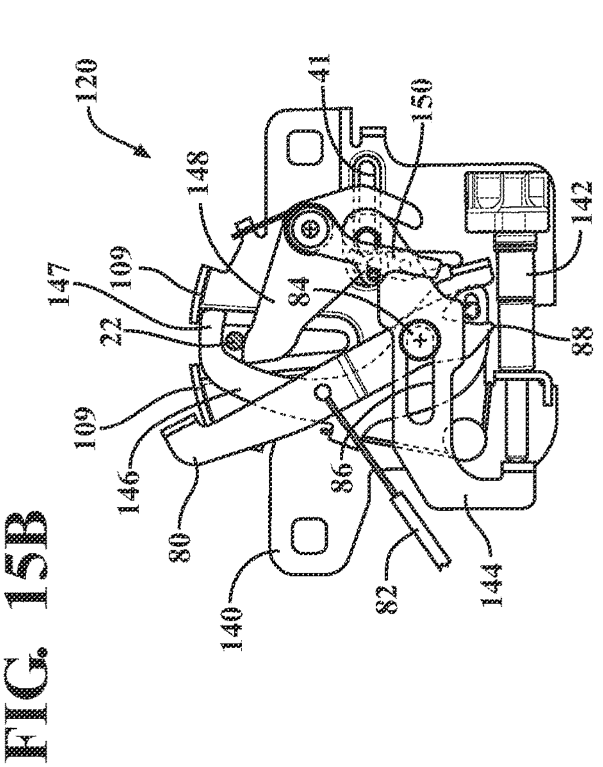
Figure 15C:
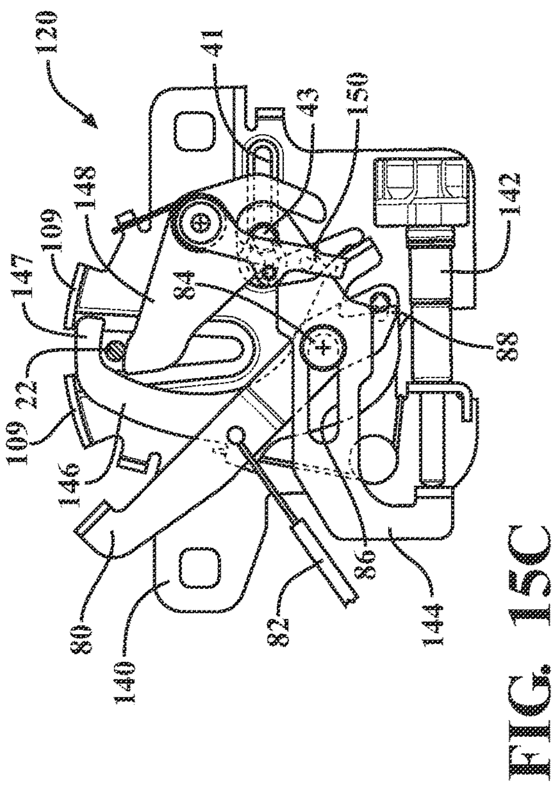
Figure 15D:
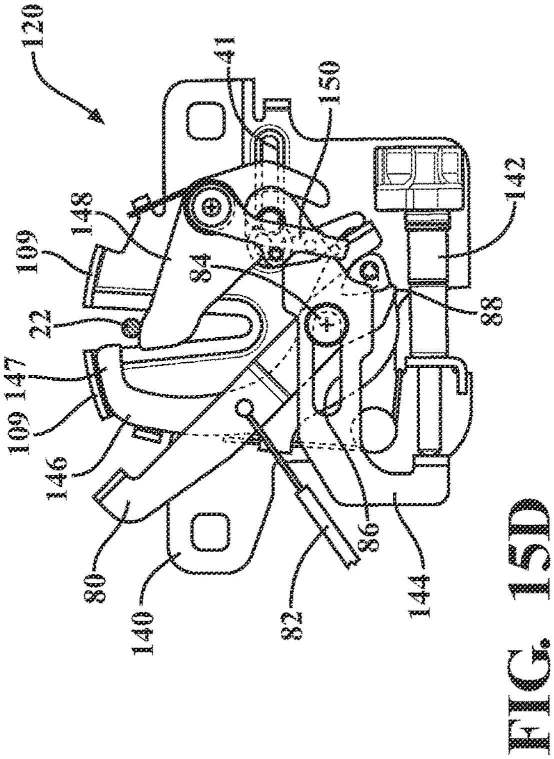

With actuator 142 moved to a fully actuated position, lift lever 148 moves the striker 22 upwardly toward the hook-shaped free end 147 into engagement or close proximity with the hook-shaped free end 147 of hook 146. With the hook-shaped free end 147 being maintained in overlying relation with striker 22 via continued engagement of elongate, planar first cam surface plateau 152 with hook protrusion 154, hook 146 prevents striker 22 from being released from pedestrian protection feature 120 and the front hood 12 of the motor vehicle 10 is moved to, and maintained in, the pop-up position (FIGS. 1B and 1C). Lift lever 148 can be held and releasably locked in the fully deployed, pop-up position by a blocking feature 74 configured for movement between a non-blocking position (FIGS. 11, 14, 15A and 15D), whereat the lift lever 148 is in the lift lever rest position, and a blocking position (FIGS. 12-13 and 15B-15C), whereat the lift lever 148 is releasably maintained in the lift lever deployed position, such as in a reset operation. The blocking feature 74 can be biased clockwise to the blocking position to bring a free blocking end 75 of the blocking feature 74 into locking engagement a locking surface of the lift lever 148, shown as a surface or locking surface 77 immediately adjacent the lift lever driven surface 164, by way of example and without limitation. As shown in FIGS. 12A and 1B, locking surface 77 can be formed as a protrusion or notch in lift lever 148, and shown as a notch 77, by way of example and without limitation, being sized for receipt of free blocking end 75 therein. The bias on the blocking feature 74 can be imparted via a spring member indicated schematically be arrow 76 (FIGS. 11 and 12), by way of example and without limitation, when the slider 144 is moved from the non-deployed position to the deployed position. The blocking feature 74 can be maintained in the non-blocking position against the bias of biasing member 76 by a surface 78 of lift lever 148 while lift lever 148 is in the lift lever rest position (FIGS. 11 and 15A), and can be biased from the blocking position back to the non-blocking position (or out from blocking relation with the lift lever 148) when the hook 146 is moved from the striker retaining position to the striker releasing position. The blocking feature 74, in the non-limiting embodiment illustrated, is biased from the blocking position to the non-blocking position by the release lever 80 when the release lever 80 is moved from a rest position (FIGS. 11-13 and 15A-15C) to an actuated position (FIGS. 14 and 15D).

The release lever 80 is operably coupled to the hook 146 for movement of the release lever 80 between a rest position, whereat the hook 146 remains in the striker retaining position while the actuator 142 is in the actuated position, and an actuated position, whereat the hook 146 is moved from the striker retaining position to a striker releasing position while the actuator 142 is in the actuated position. Accordingly, when release lever 80 is moved to the actuated position, the striker 22 can be removed from the ratchet 24 and the hood 12 can be moved to the fully open position.

To facilitate moving the release lever 80 to the actuated position, a release member 82 can be fixed to the release lever 80, wherein the release member 82 can be configured for manual and/or powered actuation from any suitable internal and/or external location on motor vehicle 10 and/or via a powered actuator 83 (FIG. 12A) to move the release lever 80 from the rest position to the actuated position, thereby moving hook 146 from the striker retaining position to the striker releasing position. Release member 82 can be provided as a rod or flexible cable, by way of example and without limitation.

The release lever 80 is shown supported for pivotal movement by a pin 84. The slider 144 can be provided having a slot 86 configured for receipt of the pin 84 therein, wherein the pin 84 slides through the slot 86 as the slider 144 moves in translation from the non-deployed position to the deployed position. The release lever 80 has a drive feature 88 and the hook 146 has a driven feature 154, with the drive feature 88 being configured for driving engagement with the driven feature 154 when the release lever 80 is moved from the rest position to the actuated position, thereby causing move hook 146 to move from the striker retaining position to a striker releasing position while the actuator 142 remains in the actuated position. To facilitate pivotal movement of hook 146, drive feature 88 pushes driven feature 154 along first cam surface 152 and off first cam surface 152 into receipt with over-travel surface 92 of slider 144. According, hook 146 is able to freely pivot about pin 84. Accordingly, although actuator 142 remains in it fired, actuated position, hood 12 can be selectively moved to the fully open position upon selectively actuating release member 82, when desired. The drive feature 88 is shown being formed by a finger or protrusion extending from an end 90 of the release lever 80, and the driven feature 154 is shown as protrusion 154 extending laterally outwardly from the hook 146.

As release lever 80 is moved from the rest position to the actuation position, in addition to causing hook 146 to be moved to the striker releasing position, a drive lug, also referred to as drive flange 92, extending from end 90 of release lever 80 is configured to forcibly engage a free end 94 of blocking feature 74 to cause blocking feature 74 to pivot out from blocking engagement with lift lever 148, thereby resetting blocking feature 74 for engagement with surface 78 of lift lever 148. Lift lever 148, if desired, is able to move back to the lift lever rest position (FIGS. 11 and 15A), thereby allowing striker 22 to be returned within ratchet 24 to the striker capture position. Accordingly, closure latch system 117 can be reset to allow hood 12 to be returned to the fully closed positon upon actuator 142 be moved to its actuated position. Accordingly, closure latch system 117 can be reset, for example manually reset by a positive intentional action of a user moving a reset lever (e.g. release lever 80, 280) to allow hood 12 to be returned to the fully closed positon after actuator 42, 142 has been moved to its actuated position without having to move the actuator 42, 142 (e.g. plunger 39, 239) back to its non-actuated position and/or without having to move slider 44, 144 from its actuated position to its non-actuated position, which may be difficult for a user due to for example a pressure build up in the actuator 42, 142 caused by a previous chemical pressurized actuation during deployment effectively hindering or preventing the return of the plunger 39, 139 of the actuator 42, 142 from its actuated position (see for example FIG. 8) to its pre-actuated position (see for example FIG. 2), or due to for example a re-compression of a large spring if actuator 42, 142 is so configured, as examples.

Figure 16:
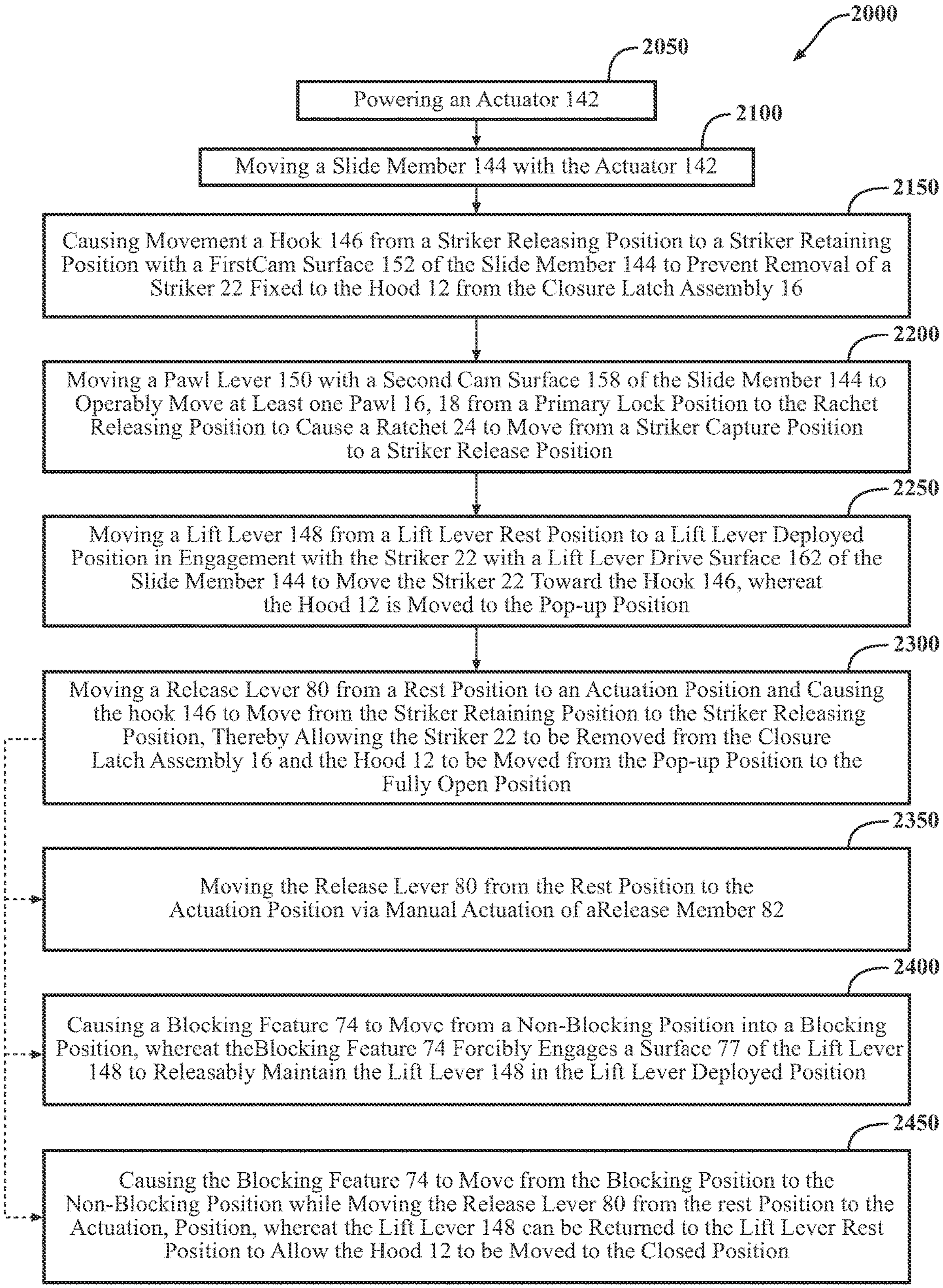
FIG. 16 is a flow diagram illustrating a method of automatically actuating a closure latch assembly for moving a hood of a motor vehicle from a closed position to a partially open, pop-up position in advance of impacting a pedestrian to minimize the potential for injury to the pedestrian upon impacting the hood, and optionally releasing the hood for movement from the pop-up position to a fully open position, and optionally resetting the closure latch assembly to allow the hood to be moved from the pop-up position to the closed position.
Figure 17B:
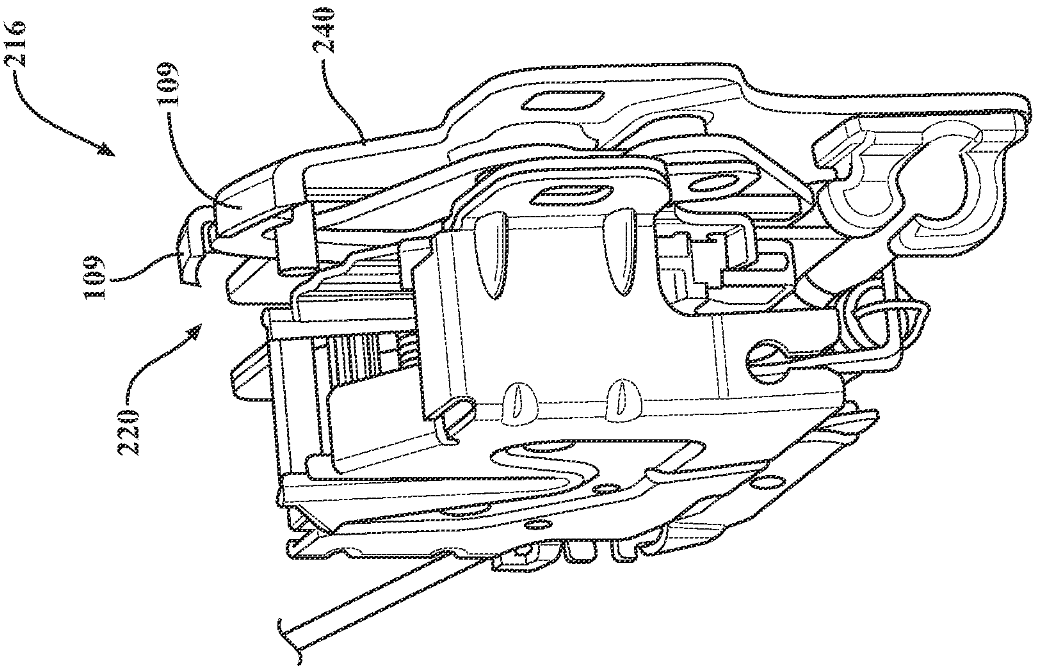
FIG. 17B is a view similar to FIG. 17A looking from an opposite end of the closure latch assembly.
Figure 17A:
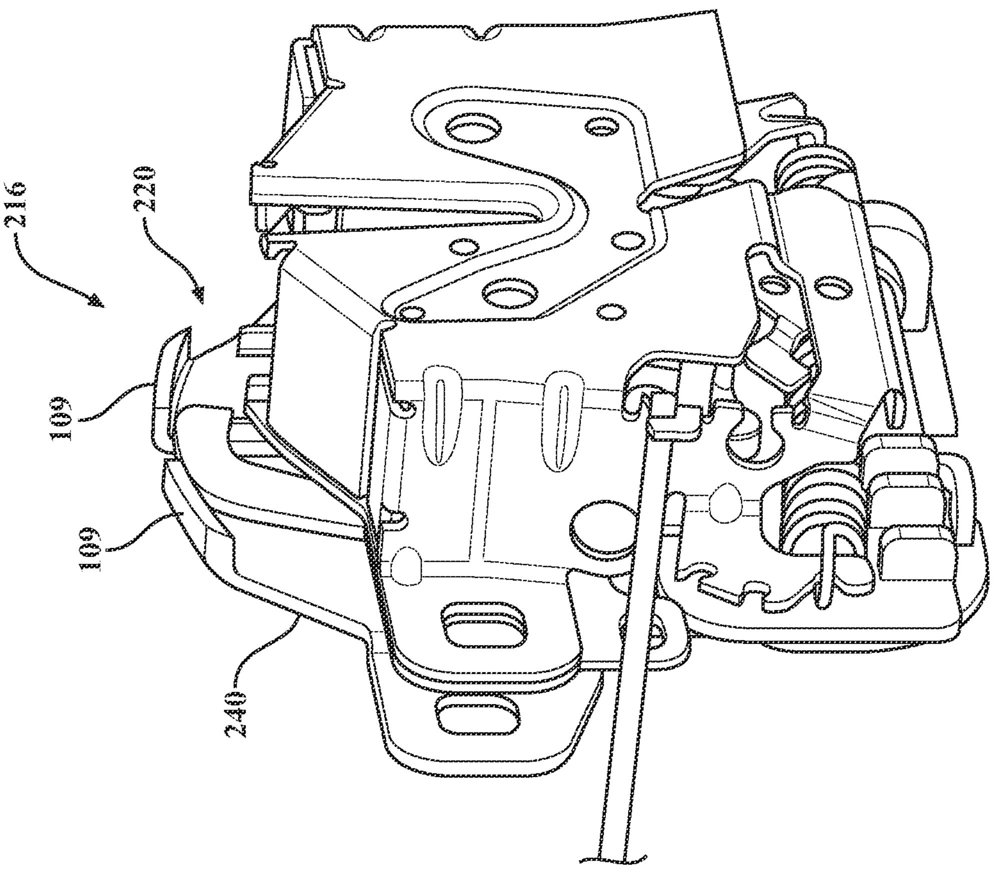
FIG. 17A is a perspective end view of a closure latch assembly of a front hood of a motor vehicle having a pedestrian protection feature constructed according to another aspect of the present disclosure.
Figure 18:
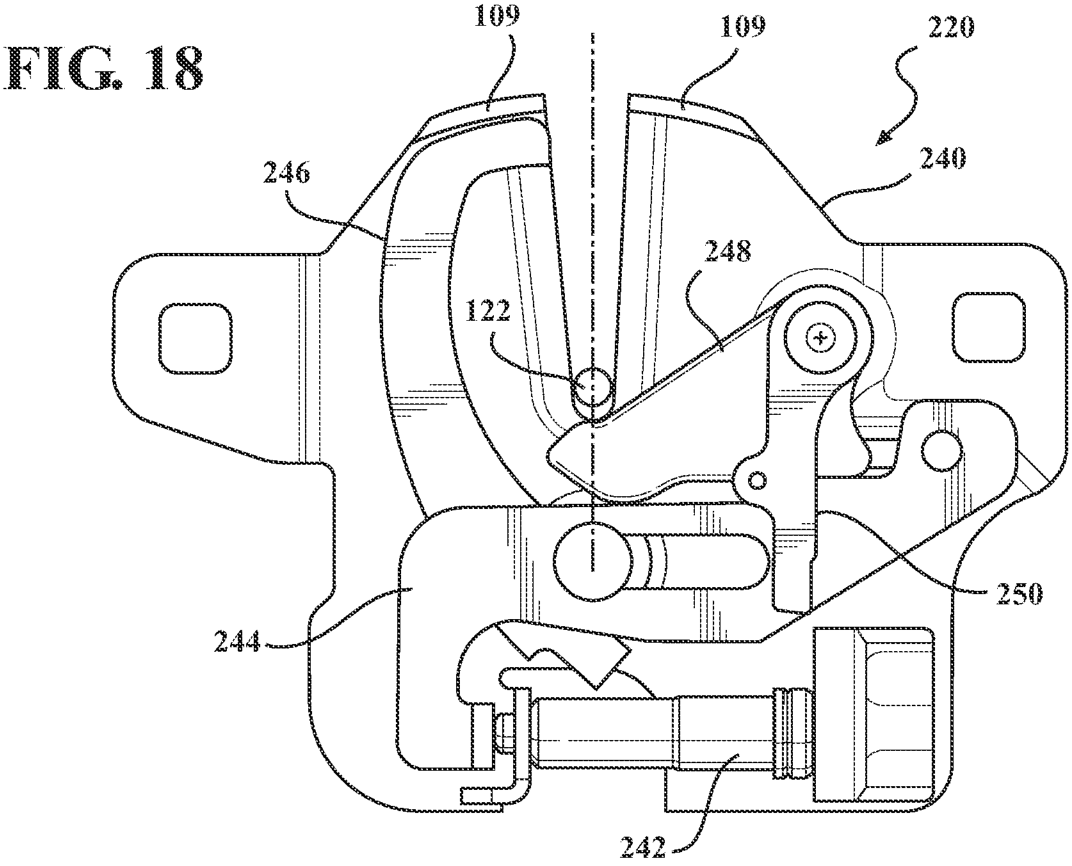
FIG. 18 illustrates a front side view of the pedestrian protection feature of the closure latch assembly of FIGS. 17A and 17B shown in a non-deployed, rest home position.

In FIG. 16, in accordance with another aspect of the disclosure, a method 2000 of automatically actuating a closure latch assembly 12 for moving a hood 12 of a motor vehicle 10 from a closed position to a partially open, pop-up position in advance of impacting a pedestrian P to minimize the potential for injury to the pedestrian P upon impacting the hood 12, and optionally releasing the hood 12 for movement from the pop-up position to a fully open position, and optionally resetting the closure latch assembly 12 to allow the hood 12 to be moved from the pop-up position to the closed position is provided. The method 2000 includes a step 2050 of powering an actuator 142; a step 2100 of moving a slide member 144 with the actuator 142; a step 2150 of causing movement a hook 146 from a striker releasing position to a striker retaining position with a first cam surface 152 of the slide member 144 to prevent removal of a striker 22 fixed to the hood 12 from the closure latch assembly 16; a step 2200 of moving a pawl lever 150 with a second cam surface 158 of the slide member 144 to operably move at least one pawl 16, 18 from a primary lock position to the ratchet releasing position to cause a ratchet 24 to move from a striker capture position to a striker release position; a step 2250 of moving a lift lever 148 from a lift lever rest position to a lift lever deployed positon in engagement with the striker 22 with a lift lever drive surface 162 of the slide member 144 to move the striker 22 toward the hook 146, whereat the hood 12 is moved to the pop-up position; and optionally a step 2300 of moving a release lever 80 from a rest position to an actuation position and causing the hook 146 to move from the striker retaining position to the striker releasing position, thereby allowing the striker 22 to be removed from the closure latch assembly 16 and the hood 12 to be moved from the pop-up position to the fully open position.

The method can further include a step 2350 of moving the release lever 80 from the rest position to the actuation position via manual actuation of a release member 82.

The method can further include a step 2400 of causing a blocking feature 74 to move from a non-blocking positon into a blocking position, whereat the blocking feature 74 forcibly engages a surface 77 of the lift lever 148 to releasably maintain the lift lever 148 in the lift lever deployed position.

The method can further include a step 2450 of causing the blocking feature 74 to move from the blocking position to the non-blocking position while moving the release lever 80 from the rest position to the actuation position, whereat the lift lever 148 can be returned to the lift lever rest position to allow the hood 12 to be moved to the closed position.

In FIGS. 18-23, a pedestrian protection system (PPS) 220 constructed in accordance with another aspect of the disclosure present disclosure is shown, wherein the same reference numerals, offset by a factor of 200, are used to identify similar features as discussed above for PPS 20, 120. PPS 220 is configured to cooperate in operable communication with closure latch assembly 216, as discussed above for PPS 20, 120 to form a closure latch system 217, with a power release function (automatically actuatable via a sensor/controller system) to automatically move hood 12 to the pop-up position in imminent anticipation of a pedestrian P coming into forcible contact with hood 12, as discussed above for closure latch system 17. Discussion hereafter is directed to PPS 220, with it to be understood that the closure latch assembly 216 of closure latch system 217 is the same as discussed above for closure latch system 17.

Figure 22:
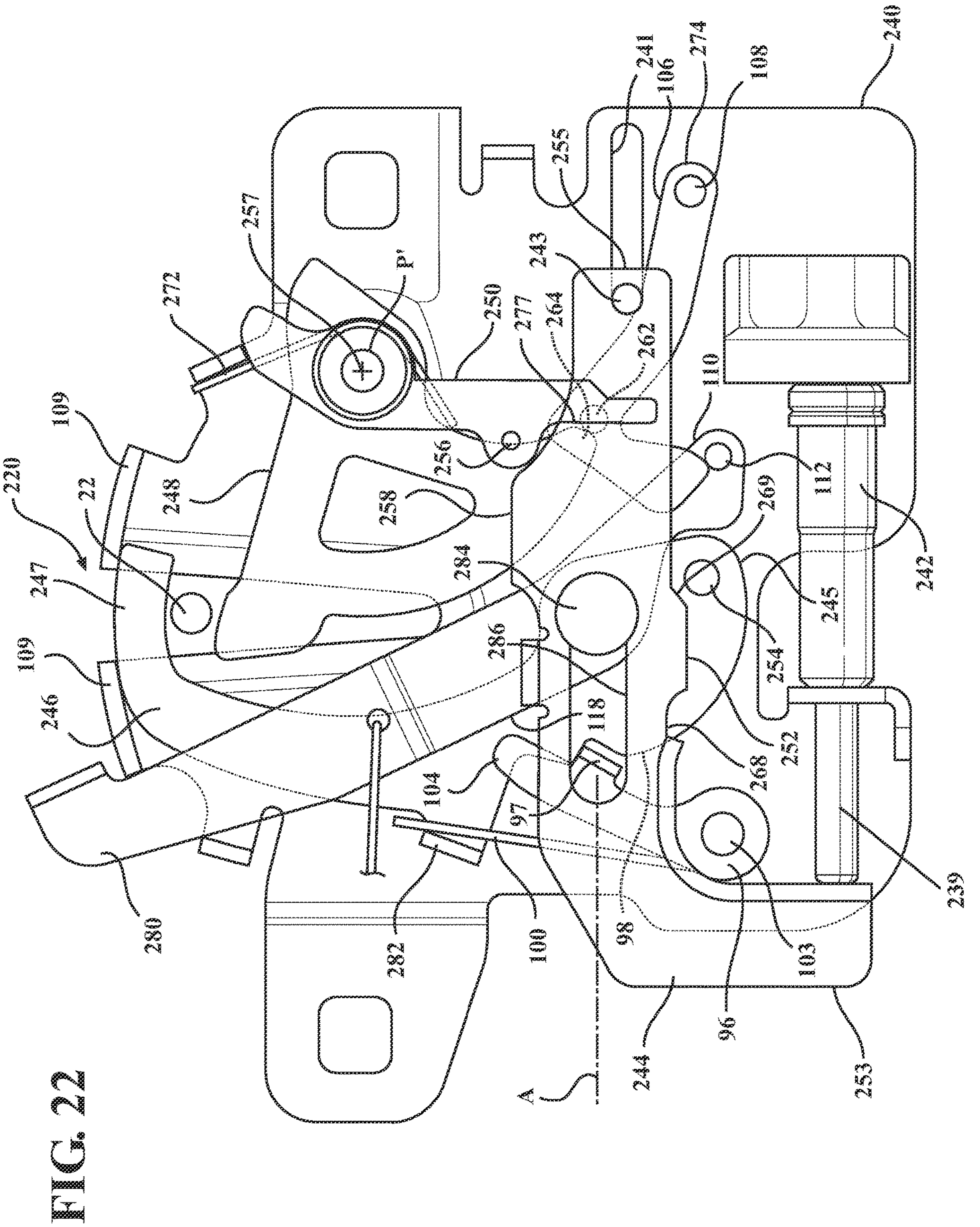
FIG. 22 is a view similar to FIG. 21 showing the actuator moved to the fully actuated position and the slider moved to the fully deployed position causing a lift lever to move a striker into engagement with the hook, whereat the front hood of the motor vehicle is moved to the pop-up position of FIGS. 1B and 1C.

PPS 220 includes similar features discussed above with regard to PPS 120, including a PPS housing 240, an actuator 242, as slider 244, a hook 246, a lift lever 248, a pawl release lever, also referred to as pawl lever 250, a blocking feature, also referred to as blocking lever 274, and a disengagement lever, also referred to as release lever 280, as examples of latch components which are controlled accordingly in response to activation of the actuator 242. These features, as discussed in more detail hereafter, function similarly as discussed above for the corresponding features of PPS 120. Slider 244 is an example of a control element which can be moved by an actuator 242 to transition the PPS 220 from a normal state (FIG. 20) to an active pedestrian protection state (FIG. 22).

Figure 19:
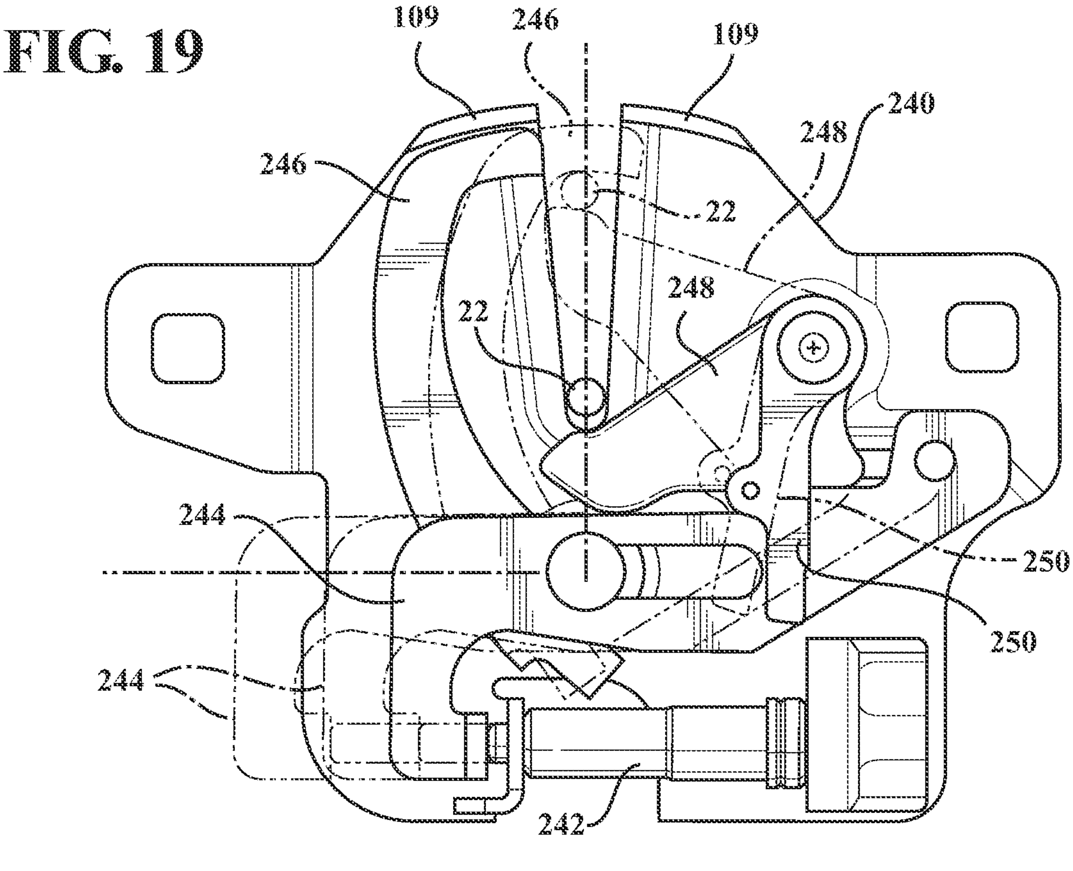
FIG. 19 is a view similar to FIG. 18 showing an actuator of the pedestrian protection feature of the closure latch assembly of FIGS. 17A and 17B as it moves from the rest home position to a fully actuated position, in dashed lines, to move a slider from a rest position (shown in solid) to a fully deployed position (shown in transparency) causing a lift lever to move from a rest position (shown in solid) to a deployed position (shown in transparency) to move a striker into engagement with a hook, whereat the front hood of the motor vehicle is moved to the pop-up position of FIGS. 1B and 1C.

The actuator 242 has a non-actuated position corresponding to the one or more latch components in a normal state (FIGS. 18 and 20) and a fully actuated position corresponding to the one or more latch components in an active pedestrian protection state (FIGS. 19, in dashed line, and 22). The actuator 242 is configured to translate slider 244 from a non-deployed position to a deployed position upon moving from the non-actuated position to the actuated position to cause hook 246 to move into a striker retaining position to prevent removal of the striker 22 from the closure latch assembly 216 and to move lift lever 248 from a lift lever rest position into engagement with the striker 22 to a lift lever deployed position to move the striker 22 into engagement with, or into close proximity with the hook 246, whereat the hood 12 is moved to the pop-up position, thereby providing a pedestrian protection feature via an enhanced cushion provided by hood 12. Translation of slider 244 causes control surfaces provided on the slider 244, such as cam surfaces (e.g. 258), rest surfaces (e.g. 268), drive surfaces (e.g. 262), overtravel surfaces (e.g. 269), to control or actuate the one or more latch components. As illustrated, control surfaces may be provided as stepped or flat regions connected with positively or negatively sloped regions provided on slider 244, as notches or indentations formed in slider 244, as well as may be provided as other forms of tabs or protrusions such as circular rivets or pins extending from slider 244. Control surfaces may be configured to interface with controlled surfaces (e.g. pine 112, 256) coupled with an associated latch component. Controlled surfaces may be illustratively provided have a curvature for facilitating sliding contact between the control surfaces of the slider 244 and the controlled surfaces of the latch components. Once activated and in an active pedestrian protection state, the one or more latch components may interact with the slider 244 so as not to urge the slider 244 to move and change the position from its deployed position which may affect the actuation of the one or more latch components e.g. reset of the latch components to a normal state from an active pedestrian protection state. For example, a bias applied to the pawl lever 250 about a second axis 257 may not cause pin 256 to act on slider 244 so as to return the slider from the actuated position to the non-actuated position. As illustratively shown in FIG. 12, pin 156 when resting against the second cam surface 158 of the slider 144 may impart a force F (see FIG. 13) against the slider 144 that is orthogonal to the axis AA (see FIG. 13) of extension of actuator 142, thereby any biasing force acting on the one or more latch components may not affect the position of the slider 144 once moved to the actuated position. Compared to some known devices where the bias of the one or more latch components may act to reset an active pedestrian mechanism after activation by applying a force in line with the axis of extension of an actuator. Alternatively, in some known devices an actuator may be provided as non-resettable (not able to be returned to a retracted or non-deployed position) causing the one or more latch components to remain in an activated position after an active pedestrian event without possibility of returning the one or more latch components to a pre-active pedestrian protection state. Therefore, provided is a closure latch system for a hood of a motor vehicle for moving a hood fixed to a striker to a pop-up position, including a closure latch assembly comprising one or more latch components, and a pedestrian protection system including an actuator having a non-actuated position and an actuated position, the actuator being configured to move a control element from a non-deployed position to a deployed position upon moving from the non-actuated position to the actuated position, one or more control surfaces configured to control the one or more components from a normal state to an active pedestrian protection state during movement of the control element from a non-deployed position to a deployed position, the closure latch assembly further having a release lever (80, 280) for resetting the one or more latch components from the active pedestrian protection state to the normal state without resetting at least one of the control element and actuator to their non-actuated positions from their actuated positions.

Figure 23:
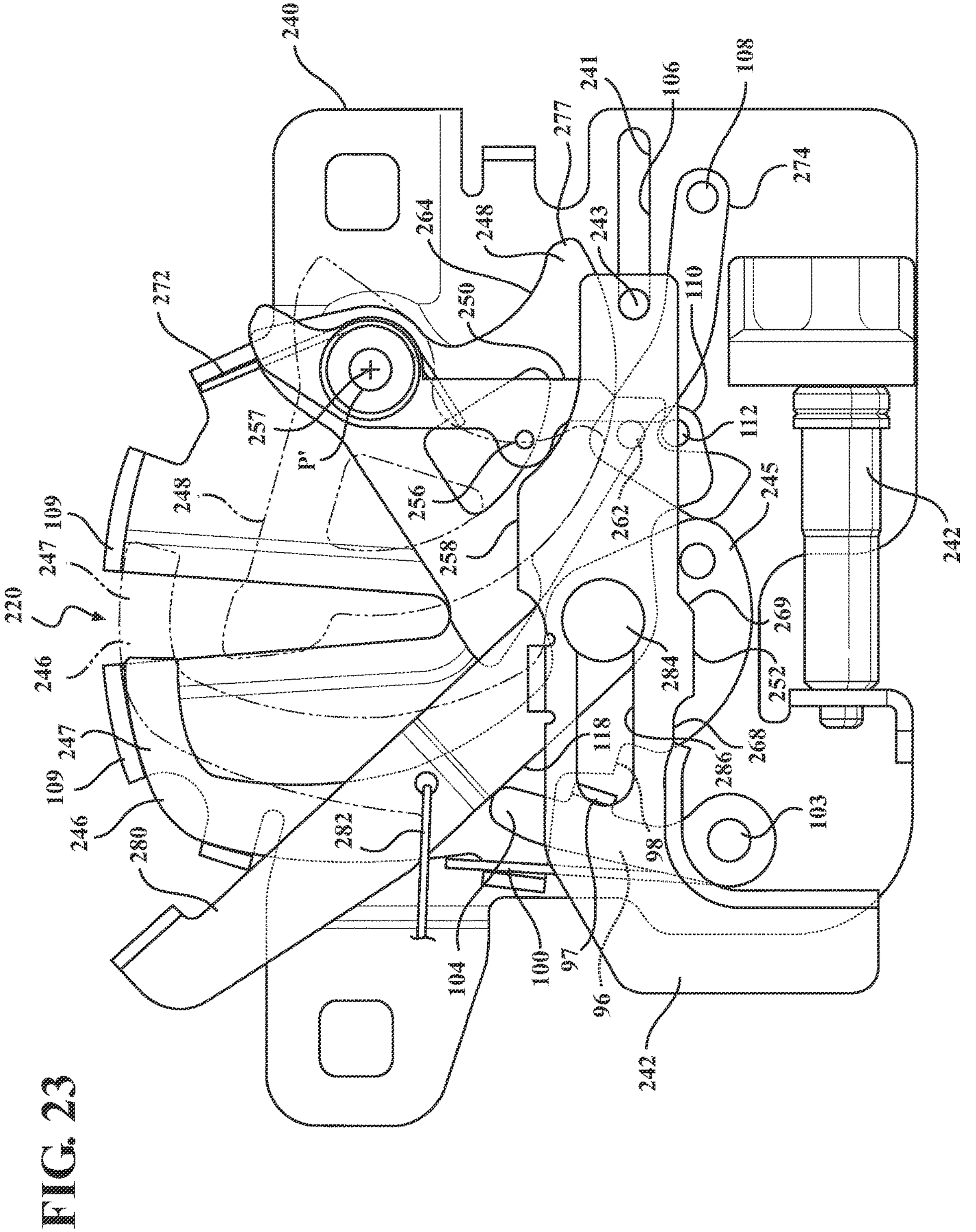
FIG. 23 is a view similar to FIG. 22 showing an actuation of a release lever of the pedestrian protection feature for moving the hook from the striker retaining position to a striker releasing position.
Figure 24:
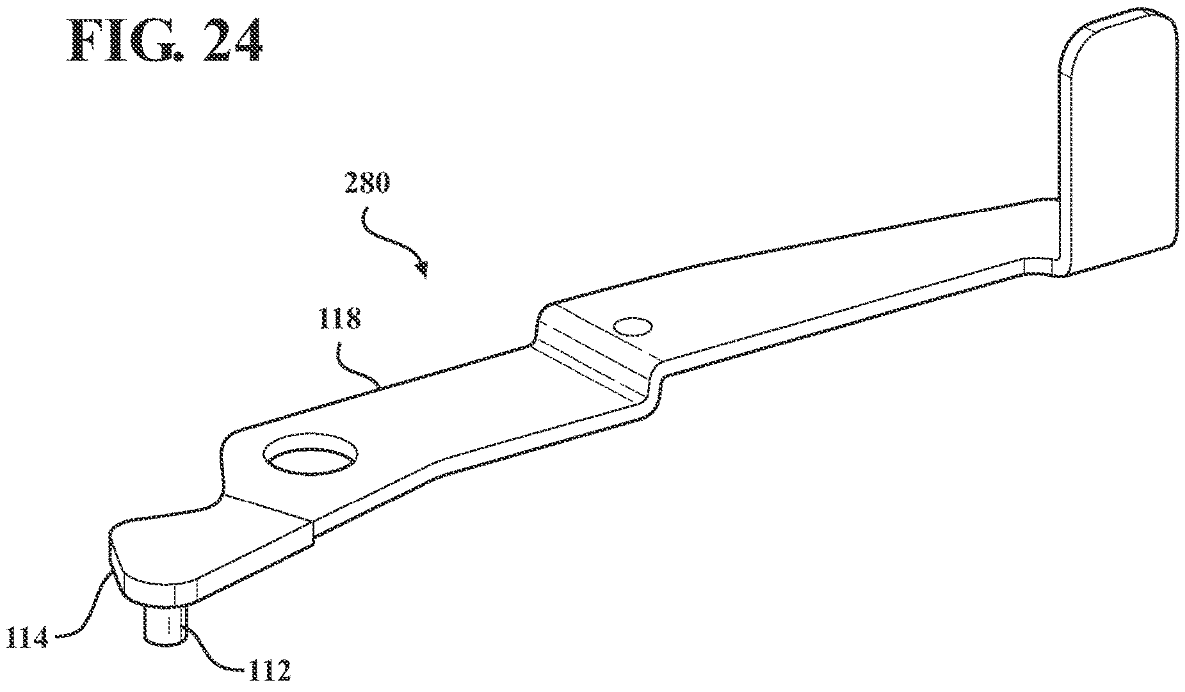
FIG. 24 is a perspective view of a disengagement lever of the pedestrian protection feature of the closure latch assembly of FIGS. 17A and 17B.

In more detail, as discussed above, upon sensing an imminent impact with a pedestrian P, the actuator 242 is automatically moved, via actuation from a signal from vehicle controller 37' and/or directly with latch controller 37, to the actuated position (FIG. 22) to translate slider 244 from a non-deployed position along a straight path extending along an axis A to the deployed position. To facilitate straight translating movement of slider 244, housing 240 can have a guide feature, such as straight slot 241 (FIGS. 20-23), by way of example and without limitation, configured for receipt of a protrusion or pin 243 therein for guided translation therethrough. The pin 243 can be operably connected to slider 244 via an intermediate connector or fixed directly to slider 244 as an integral component thereof via any desired fixation mechanism, including a mechanical fastener, weld joint, adhesive, or combination thereof. Translation of slider 244 to the deployed position causes hook 246 to move, such as via being pivoted, as indicated by arrow r1' (FIG. 21), about a hook axis, also referred to as first axis 246', from a striker release position to a striker capture position, also referred to as striker retention position. To releasably hold hook 246 in the striker retention position when desired, a stop member, also referred to as stop surface or hook blocking pawl 96 can be biased from a non-blocking, rest position into a blocking position (FIGS. 21 and 22), whereat a lug 97 of hook blocking pawl 96, shown as a laterally extending tab, by way of example and without limitation, is brought into blocking engagement with a lock surface 98 of hook 246, with lock surface being shown as a shoulder 98 of a recessed notch. To facilitate biasing hook blocking pawl 96 to its blocking position, a hook blocking pawl biasing member 100, such as a torsion spring, can be provided to bias hook blocking pawl 96 into engagement with hook 246, shown as being biased in a clockwise direction by arrow 101 about a pin 103. As such, as hook 246 is biased by slider 244 to its striker retaining position, as discussed further below, hook blocking pawl 96 is biased to pivot in the clockwise direction of arrow 101 to bring lug 97 into locked, blocking engagement with lock surface 98. Hook blocking pawl 96 extends from pin 103 to a free end 104, wherein free end 104 is aligned for select engagement with hook 246, as shown in FIG. 23, to facilitate releasing hook blocking pawl 96 from blocking engagement with hook 246 when desired to open hood 12, as discussed further hereafter.

The slider 244 has a rest surface 268 arranged for receipt of a driven feature 254 of hook 246 while the actuator 242 is in the non-actuated position, whereat the hook 246 is in the striker releasing position. During translation of slider 244 along axis A, a first drive member, also referred to as first cam surface 252 of slider 244, located between a first end 253 of slider 244 and a second end 255 of slider 244, is brought into camming engagement with hook driven feature or member, also referred to as hook protrusion 254 extending outwardly adjacent a first end 245 of hook 246 proximate hook axis 246', to pivot hook 246 clockwise, as viewed in FIG. 21, about hook axis 246' to bring a hook-shaped second or free end 247 into blocking, overlying relation with striker 22, thereby preventing striker 22 from passing by hook free end 247 and being released from the pedestrian protection feature 220 and releasably maintaining hook 246 in an actuated position with hook-shaped second end 247 in overlying relation with striker 22. Thereafter, when desired to release hood 12 from the pop-up position, whereat hook 246 is in striker retaining position, to the fully open position, hook protrusion 254 can be moved by release lever 280, while the actuator 242 remains in the actuated position, to an over-travel surface 269 of slider 244 arranged for receipt of the hook protrusion 254, whereat the hook 246 is moved to the striker releasing position. The rest surface 268 is shown extending from a first end 271 (FIG. 20) of the cam surface 252 and the over-travel surface 269 is shown extending from a second end 273 of the first cam surface 252 opposite the first end 271, and thus, first cam surface 252 extends between the rest surface 268 and the over-travel surface 269.

Pawls 26, 28 of the closure latch assembly 216 are moved from a primary lock position to a ratchet release position via movement, via clockwise rotational movement (as viewed in FIG. 21) of pawl lever 250 about a second axis 257 in response to a pawl drive member, also referred to as pin or lug 256 extending laterally outwardly from pawl lever 250, of the pawl lever 250 being driven by a second drive member, also referred to as second cam surface 258 of the slider 244. Second cam surface 258 is shown as a raised plateau generally opposite first cam surface 252, also formed as a raised plateau.

Rotational movement of pawl lever 250 in the clockwise direction causes coupling link 30 to move along the direction of arrow A1 (FIG. 6), whereupon a drive member, shown as a protrusion 60 of coupling link 30, engages and pivots primary pawl 26 about a primary pawl axis 27 to its ratchet release position, while linked connection 61 between coupling link 30 and secondary pawl 28 causes secondary pawl 28 to move pivotably about a secondary pawl axis 29 to its ratchet release position. As slider 244 translates along axis A, lug 256 moves onto second cam surface 258, whereat primary and secondary pawls 26, 28 are maintained in their respective ratchet releasing positions.

Figure 20:
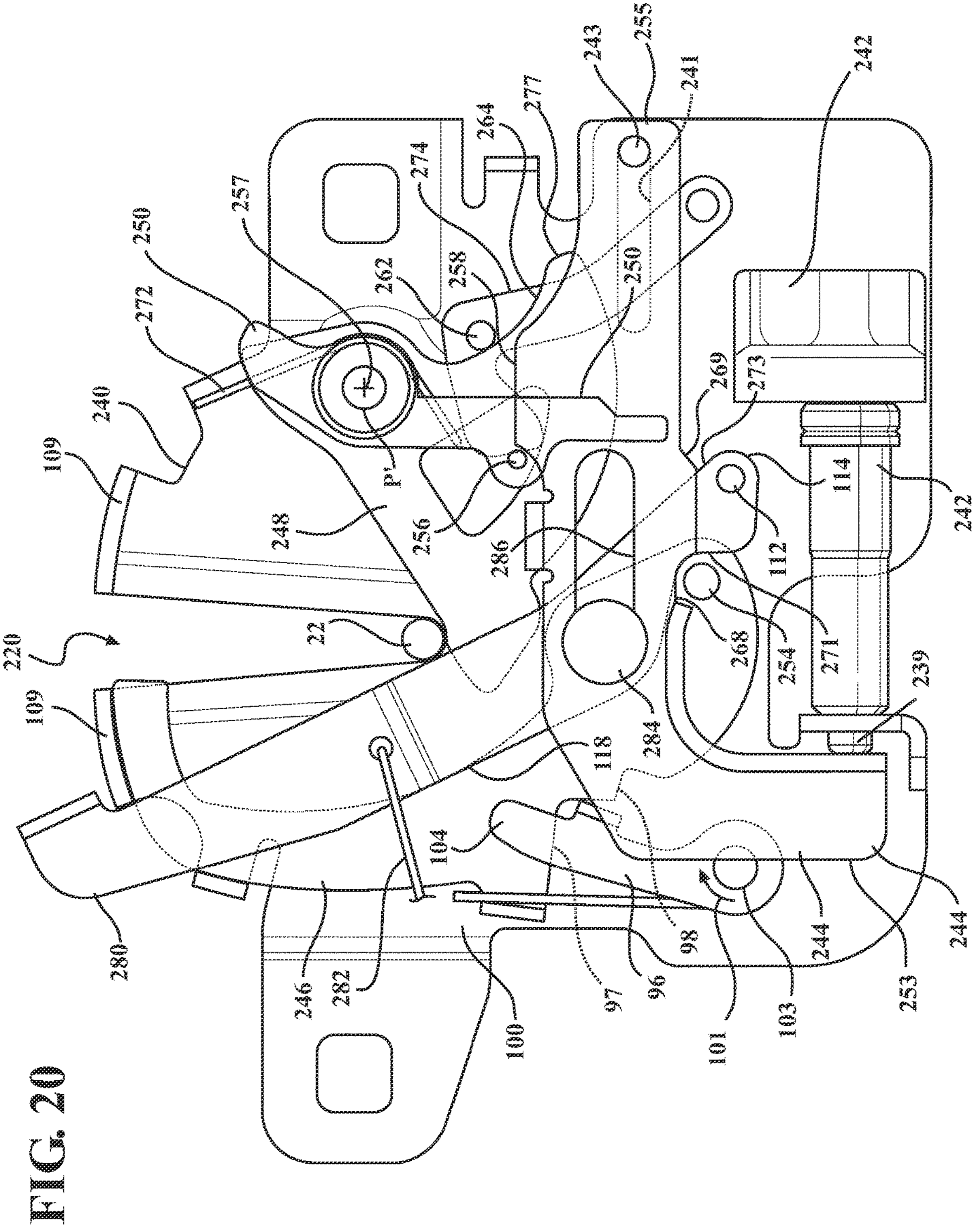
FIG. 20 is a view similar to FIG. 18 showing in more detail various components of the pedestrian protection feature of the closure latch assembly of FIGS. 17A and 17B while in the non-deployed, rest home position.
Figure 21:
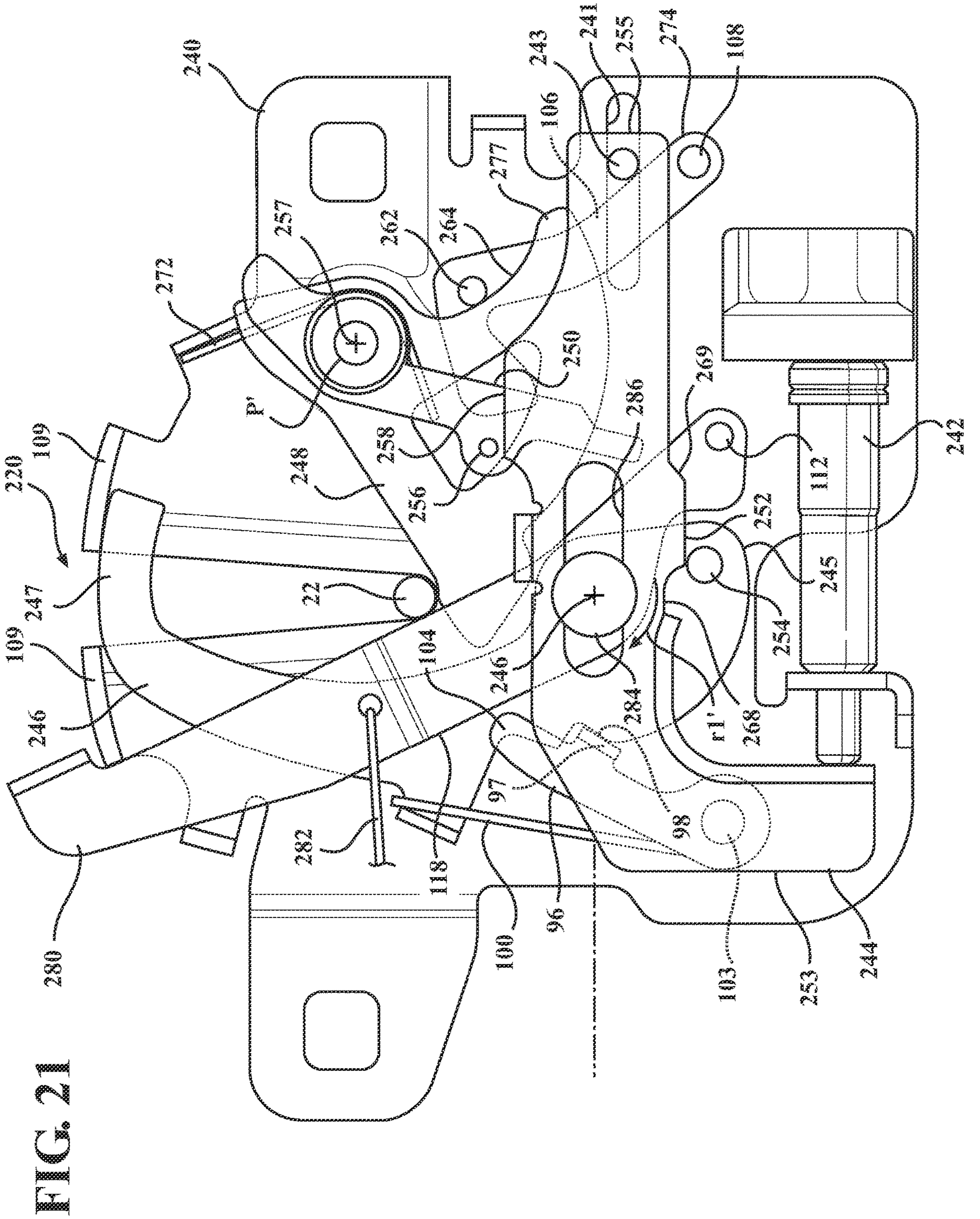
FIG. 21 is a view similar to FIG. 20 showing the actuator of the pedestrian protection feature moving toward a fully actuated position (shown in intermediate position) to move a slider toward a fully deployed position (shown in intermediate position) causing a hook to move to a striker retaining position.

As actuator 242 is moved to the actuated position and slider 244 is moved along axis A to the deployed position (FIGS. 19, 22 and 23), a lift lever cam surface, also referred to as lift lever driven surface 264, of lift lever 248 is engaged and driven by a lift lever drive surface, shown as being formed by a pin 262 extending laterally outwardly from blocking lever 274 into sliding engagement with lift lever driven surface 264. Upon slider 244 reaching the deployed position, and lift lever 248 being cammed upwardly to its fully deployed position, pin 262 is brought into blocking engagement with an end blocking surface 277 of lift lever 248 so that lift lever 248 is prevented from inadvertent return toward a non-deployed, home position (FIG. 20). To facilitate smooth camming motion of lift lever 248 to its deployed position, lift lever driven surface 264 can be formed as a smooth, arcuate surface, shown as a concave surface, thereby enhancing the camming movement of lift lever 248 between its. Lift lever 248 is caused to move pivotably about axis 257 in a clockwise direction against a bias, such as imparted by a spring member 272, wherein spring member 272 acts to bias lift lever 248 toward its non-deployed, home position absent being lifted forcibly against the bias of spring member 272. Lift lever 248 and pawl lever 250 are shown supported about a common pin P' for rotation about the common axis 257. Lift lever driven surface 264 extends generally radially from axis 257, providing a lever arm to increase torque, thereby minimizing the amount of force required by lift lever drive surface 262 to pivot lift lever 248 about axis 257. Accordingly, the force required to be exerted by actuator 242 on slider 244 can be minimized.

As actuator 242 moves toward its fully actuated position, pin 243 engages a driven cam surface 106 of blocking lever 274 to cause blocking lever 274 to move pivotably about a pin 108, thereby driving pin 262 forcibly against blocking lever 274 and slidably along driven surface 264. As such, lift lever 248 moves the striker 22 upwardly toward the hook-shaped free end 247 into engagement with or close proximity with the hook-shaped free end 247 of hook 246. With the hook-shaped free end 247 being maintained in overlying relation with striker 22 via continued engagement of elongate, planar first cam surface plateau 252 with hook protrusion 254, hook 246 prevents striker 22 from being released from pedestrian protection feature 220 and the front hood 12 of the motor vehicle 10 is moved to, and maintained in, the pop-up position (FIGS. 1B and 1C). To further enhance the striker retention strength of hook-shaped free end 247, an anti-deformation feature provided as an overhanging lip, also referred to as flange 109 can be provided to overlie and obstruct the potential upward movement of the hook-shaped free end 270 when the hook 246 is in the striker retaining position. Flange 109 can be formed as a monolithic piece of material with housing 240, such as in a bending or stamping operation, by way of example and without limitation, or as an add-on feature, such as via any suitable mechanical fastener and/or weld joint and/or adhesive material. Flange 109 inhibits the elastic and plastic deformation of hook-shaped free end 270 when the hook 246 is in the striker retaining position, thereby providing added assurance that the striker 22 will be retained by hook-shaped free end 270 when the hook 246 is in the striker retaining position. It is to be recognized that the flange 109, as well as the entirety of pedestrian protection system 220, can be provided as an aftermarket mechanism to be retrofitted to an existing latch.

Lift lever 248 can be held and releasably locked in the fully deployed, pop-up position by blocking lever 274. The blocking lever 274 can be biased counterclockwise toward the blocking position to facilitate moving the blocking lever 274 out from locking engagement with the lift lever 248, when desired. The blocking lever 274 is shown as being generally L-shaped, having a free end 110 at an opposite end from the location of pin 108, with free end 110 being brought into engagement with a pin 112 extending laterally outwardly adjacent an end 114 of release lever 280 when in the fully deployed, blocking position. Accordingly, pin 112 inhibits blocking lever 274 from moving beyond its blocking position when in the deployed position.

Figure 25:
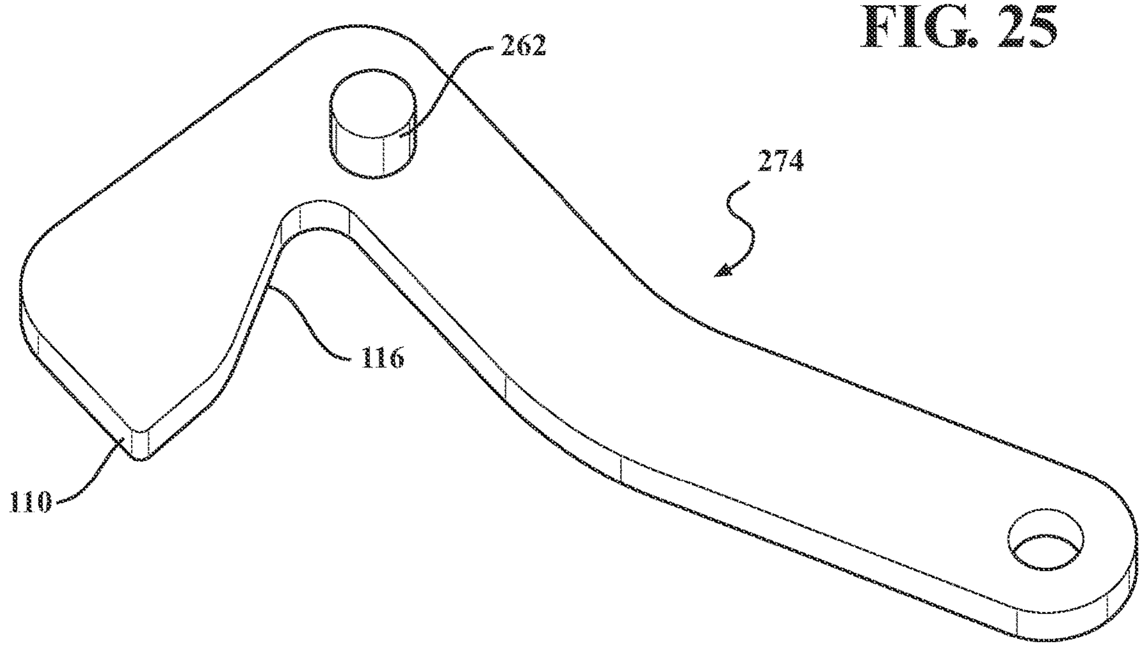
FIG. 25 is a perspective view of a blocking lever of the pedestrian protection feature of the closure latch assembly of FIGS. 17A and 17B.

The release lever 280 is operable to move between a rest position (FIG. 22), whereat the hook 246 remains in the striker retaining position due to being held by lug 97 of hook blocking pawl 96 and whereat lift lever 248 remains in the deployed position due to be blocked by driving pin 262 of lift lever 248 while the actuator 242 is in the actuated position, and an actuated position (FIG. 23), whereat the hook 246 is moved from the striker retaining position to a striker releasing position and simultaneously lift lever 248 is moved to its non-deployed, home position while the actuator 242 is in the actuated position. Accordingly, while actuator 242 is in its actuated position, striker 22 can be selectively and intentionally removed from the ratchet 24 and the hood 12 can be moved to the fully open position. In particular, movement of release lever 280 to its actuated position brings an edge surface 118 of release lever 280 into engagement with free end 104 of hook blocking pawl 96, thereby causing hook blocking pawl 96 to be pivoted counterclockwise against the bias of hook blocking pawl biasing member 100, which causes lug 97 to be removed from blocking engagement with lock surface 98 of hook 246, and allow hook 246 to move under a spring bias to its striker releasing position. Movement of release lever 280 to its actuated position further causes pin 112 to move out from blocking engagement with free end 110 of blocking lever 274, with pin 112 shown as being received in a recess, also referred to as notch or pocket 116 (FIG. 25) formed in a region where one leg joins the other leg of blocking lever 274, thereby allowing blocking lever 274 to move counterclockwise under the bias out from blocking engagement with lift lever 248 such that lift lever 248 returns to its non-deployed, home position.

To facilitate moving the release lever 280 to the actuated position, a release member 282 can be fixed to the release lever 280, wherein the release member 82 can be configured for manual and/or powered actuation from any suitable internal and/or external location on motor vehicle 10 and/or via a powered actuator 83 (FIG. 12A) to move the release lever 280 from the rest position to the actuated position, thereby moving hook 246 from the striker retaining position to the striker releasing position. Release member 282 can be provided as a rod or flexible cable, by way of example and without limitation.

The release lever 280 is shown supported for pivotal movement by a pin 284. The slider 244 can be provided having a slot 286 configured for receipt of the pin 284 therein, wherein the pin 284 slides through the slot 286 as the slider 244 moves in translation from the non-deployed position to the deployed position, as discussed above for slider 144.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch system for a hood of a motor vehicle for moving a hood fixed to a striker to a pop-up position, comprising:

a closure latch assembly including a ratchet and at least one pawl, the ratchet being moveable between a striker capture position whereat the ratchet retains the striker in a fully captured position and whereat the hood is in a fully closed position, a striker partial release position whereat the ratchet retains the striker in a partially released position and whereat the hood is in a partially open position, and a striker release position whereat the ratchet releases the striker and whereat the hood can be moved to a fully open position, the at least one pawl being moveable between a primary lock position whereat the at least one pawl holds the ratchet in the striker capture position and a ratchet releasing position whereat the at least one pawl releases the ratchet to the striker partial release position; and a pedestrian protection system including an actuator configured to move automatically from a non-actuated position to an actuated position in response to an active pedestrian event, the actuator being configured to translate a slider from a non-deployed position to a deployed position upon moving from the non-actuated position to the actuated position to cause a hook to move into a striker retaining position to prevent removal of the striker from the closure latch assembly and to move a lift lever from a lift lever rest position into engagement with the striker to a lift lever deployed position, whereat the hood is moved to the pop-up position, wherein the slider translates from the non-deployed position along a straight path to the deployed position to cause the hook to pivot about a hook axis to the striker retaining position.

2. The closure latch system of claim 1, wherein the pedestrian protection system further includes a pawl lever, the slider being configured to move the pawl lever as the slider moves from the non-deployed position to the deployed position to move the at least one pawl from the primary lock position to the ratchet releasing position.

3. The closure latch system of claim 2, wherein the slider has a first cam surface configured to move the hook into the striker retaining position and a second cam surface to move the pawl lever to allow the pawl to move from the primary lock position to the ratchet releasing position.

4. The closure latch system of claim 3, wherein the slider has a third cam surface configured to move the lift lever to the lift lever deployed position.

5. The closure latch system of claim 3, wherein the first cam surface moves the hook into the striker retaining position prior to the second cam surface moving the pawl lever.

6. The closure latch system of claim 2, wherein the lift lever and the pawl lever pivot about a common axis.

7. The closure latch system of claim 1, further including a release lever operably coupled to the hook, the release lever having a rest position, whereat the hook remains in the striker retaining position while the actuator is in the actuated position, and an actuated position, whereat the hook is moved from the striker retaining position to a striker releasing position while the actuator is in the actuated position, whereat the striker can be removed from the ratchet and the hood can be moved to the fully open position.

8. The closure latch system of claim 7, further including a hook blocking pawl moveable between a non-blocking, rest position and a blocking position, wherein the hook blocking pawl is brought into blocking engagement with a lock surface of the hook to maintain the hook in the striker retaining position while the actuator is in the actuated position.

9. The closure latch system of claim 8, further including a blocking feature configured for movement between a non-blocking position, whereat the lift lever is in the lift lever rest position, and a blocking position, whereat the lift lever is releasably maintained in the lift lever deployed position by the blocking feature.

10. The closure latch system of claim 9, wherein the blocking feature is biased to the blocking position when the slider is moved from the non-deployed position to the deployed position, and wherein the blocking feature is biased from the blocking position to the non-blocking position when the hook is moved from the striker retaining position to the striker releasing position.

11. The closure latch system of claim 10, wherein the slider engages the blocking feature to bias the blocking feature from the non-blocking position to the blocking position.

12. The closure latch system of claim 11, wherein movement of release lever to its actuated position causes the hook blocking pawl to move from the blocking position to the non-blocking, whereat the hook is moved from the striker retaining position to a striker releasing position while the actuator is in the actuated position.

13. The closure latch system of claim 1, wherein the pedestrian protection system is configured to be connected to a latch frame plate of an existing closure latch assembly.

14. A closure latch system for a hood of a motor vehicle for moving a hood fixed to a striker to a pop-up position, comprising:

a closure latch assembly including a ratchet and at least one pawl, the ratchet being moveable between a striker capture position whereat the ratchet retains the striker in a fully captured position and whereat the hood is in a fully closed position, a striker partial release position whereat the ratchet retains the striker in a partially released position and whereat the hood is in a partially open position, and a striker release position whereat the ratchet releases the striker and whereat the hood can be moved to a fully open position, the at least one pawl being moveable between a primary lock position whereat the at least one pawl holds the ratchet in the striker capture position and a ratchet releasing position whereat the at least one pawl releases the ratchet to the striker partial release position;

a pedestrian protection system including an actuator configured to move automatically from a non-actuated position to an actuated position in response to an active pedestrian event, the actuator being configured to translate a slider from a non-deployed position to a deployed position upon moving from the non-actuated position to the actuated position to cause a hook to move into a striker retaining position to prevent removal of the striker from the closure latch assembly and to move a lift lever from a lift lever rest position into engagement with the striker to a lift lever deployed position, whereat the hood is moved to the pop-up position;

a release lever operably coupled to the hook, the release lever having a rest position, whereat the hook remains in the striker retaining position while the actuator is in the actuated position, and an actuated position, whereat the hook is moved from the striker retaining position to a striker releasing position while the actuator is in the actuated position, whereat the striker can be removed from the ratchet and the hood can be moved to the fully open position; and wherein the release lever is supported for pivotal movement by a pin, the slider having a slot configured for receipt of the pin therein, wherein the pin slides through the slot as the slider moves from the non-deployed position to the deployed position.

15. The closure latch system of claim 14, wherein the release lever has a drive feature and the hook has a driven feature, the drive feature being configured for engagement with the driven feature when the release lever moves from the rest position to the actuated position to move the hook from the striker retaining position to a striker releasing position while the actuator is in the actuated position.

16. The closure latch system of claim 15, wherein the slider has a rest surface arranged for receipt of the driven feature while the actuator is in the non-actuated position, whereat the hook is in the striker releasing position, a first cam surface arranged for engagement with the driven feature while the actuator is in the actuated position, whereat the hook is in striker retaining position, and an over-travel surface arranged for receipt of the driven feature while the actuator is in the actuated position, whereat the hook is in the striker releasing position.

17. A closure latch system for a hood of a motor vehicle for moving a hood fixed to a striker to a pop-up position, comprising:

a closure latch assembly including a ratchet and at least one pawl, the ratchet being moveable between a striker capture position whereat the ratchet retains the striker in a fully captured position and whereat the hood is in a fully closed position, a striker partial release position whereat the ratchet retains the striker in a partially released position and whereat the hood is in a partially open position, and a striker release position whereat the ratchet releases the striker and whereat the hood can be moved to a fully open position, the at least one pawl being moveable between a primary lock position whereat the at least one pawl holds the ratchet in the striker capture position and a ratchet releasing position whereat the at least one pawl releases the ratchet to the striker partial release position;

a pedestrian protection system including an actuator configured to move automatically from a non-actuated position to an actuated position in response to an active pedestrian event, the actuator being configured to translate a slider from a non-deployed position to a deployed position upon moving from the non-actuated position to the actuated position to cause a hook to move into a striker retaining position to prevent removal of the striker from the closure latch assembly and to move a lift lever from a lift lever rest position into engagement with the striker to a lift lever deployed position, whereat the hood is moved to the pop-up position; and wherein the lift lever has a lift lever driven surface and the slider has a lift lever drive surface, wherein the lift lever drive surface engages the lift lever driven surface to move the lift lever into engagement with the striker to move the striker into engagement with the hook while the hook is in the striker retaining position.

18. A method of automatically actuating a closure latch assembly for moving a hood of a motor vehicle from a closed position to a partially open, pop-up position in advance of impacting a pedestrian to minimize the potential for injury to the pedestrian upon impacting the hood, and optionally releasing the hood for movement from the pop-up position to a fully open position, comprising:

powering an actuator;

moving a slide member with the actuator;

causing movement a hook from a striker releasing position to a striker retaining position with a first cam surface of the slide member to prevent removal of a striker fixed to the hood from the closure latch assembly;

moving a pawl lever with a second cam surface of the slide member to operably move at least one pawl from a primary lock position to the ratchet releasing position to cause a ratchet to move from a striker capture position to a striker release position; and moving a lift lever from a lift lever rest position to a lift lever deployed position in engagement with the striker with a lift lever drive surface to move the striker toward the hook, whereat the hood is moved to the pop-up position; and optionally, moving a release lever from a rest position to an actuation position and causing the hook to move from the striker retaining position to the striker releasing position, thereby allowing the striker to be removed from the closure latch assembly and the hood to be moved from the pop-up position to the fully open position.

19. A closure latch system for a hood of a motor vehicle for moving a hood fixed to a striker to a pop-up position, comprising:

a closure latch assembly comprising latch components; and a pedestrian protection system including an actuator having a non-actuated position and an actuated position, the actuator being configured to translate a slider along a straight path from a non-deployed position to a deployed position upon moving from the non-actuated position to the actuated position, wherein the slider comprises one or more control surfaces configured to control the latch components during the slider translating from a non-deployed position to a deployed position, wherein the latch components include a pawl, wherein the pawl is configured to release a ratchet in response to the slider translating along the straight path.

20. The closure latch system of claim 19, wherein the hood is for a frunk of the motor vehicle.

* * * * *